US012781079B2

(12) United States Patent
Aoyama et al.

(10) Patent No.: US 12,781,079 B2
(45) Date of Patent: Nov. 3, 2026

(54) CURABLE COMPOSITION FOR INKJET FOR METAL-CONTAINING BASE MATERIAL, SOLDER RESIST, AND INKJET RECORDING METHOD

(71) Applicant: Konica Minolta, Inc., Tokyo (JP)

(72) Inventors: Ryo Aoyama, Hino (JP); Masato Ota, Hino (JP); Tomomi Sugai, Kokubunji (JP)

(73) Assignee: KONICA MINOLTA, INC., Tokyo (JP)

( * ) Notice: Subject to any disclaimer, the term of this patent is extended or adjusted under 35 U.S.C. 154(b) by 128 days.

(21) Appl. No.: 18/889,937

(22) Filed: Sep. 19, 2024

(65) Prior Publication Data

US 2025/0101247 A1 Mar. 27, 2025

(30) Foreign Application Priority Data

Sep. 27, 2023 (JP) ................................ 2023-166177
Mar. 7, 2024 (JP) ................................ 2024-034772

(51) Int. Cl.

*C09D 11/38* (2014.01)
*B41M 5/00* (2006.01)
*B41M 7/00* (2006.01)
*C09D 11/101* (2014.01)
*C09D 11/107* (2014.01)

(52) U.S. Cl.

CPC ........... *C09D 11/38* (2013.01); *B41M 5/0047* (2013.01); *B41M 5/0058* (2013.01); *B41M 7/0081* (2013.01); *B41M 7/009* (2013.01); *C09D 11/101* (2013.01); *C09D 11/107* (2013.01)

(58) Field of Classification Search

CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; C09D 11/108; B41M 5/0011; B41M 5/0017; B41M 5/0023; B41M 5/0047; B41M 7/00; B41M 7/0072; B41M 5/52; B41M 5/5218; B41M 5/5227

See application file for complete search history.

(56) References Cited

U.S. PATENT DOCUMENTS

| | | | | |
|---|---|---|---|---|
| 2008/0124456 | A1* | 5/2008 | Satou | C09D 11/101 528/332 |
| 2014/0160215 | A1* | 6/2014 | Saito | B41M 5/0064 522/167 |
| 2017/0298005 | A1* | 10/2017 | Tanikawa | C09D 11/38 |
| 2019/0300739 | A1* | 10/2019 | Torfs | C09D 11/322 |
| 2019/0367758 | A1* | 12/2019 | Torfs | C09D 11/037 |

FOREIGN PATENT DOCUMENTS

| | | | |
|---|---|---|---|
| EP | 4 245 817 | A1 | 9/2023 |
| JP | 5986701 | B1 | 9/2016 |
| WO | 2014/167671 | A1 | 10/2014 |
| WO | 2024/017926 | A1 | 1/2024 |

OTHER PUBLICATIONS

Extended European Search Report, dated Feb. 11, 2025, issued for the corresponding European Patent Application No. 24200444.8, 6 pages.

* cited by examiner

*Primary Examiner* — Manish S Shah
(74) *Attorney, Agent, or Firm* — LUCAS & MERCANTI, LLP

(57) ABSTRACT

A curable composition for inkjet for metal-containing base material, including: a polymerizable compound; a polymerization initiator and a pigment, and being cured by irradiation with an active ray, wherein the curable composition contains a nitrogen-containing aromatic heterocyclic compound having a tertiary amine. In one embodiment, in the nitrogen-containing aromatic heterocyclic compound, a benzene ring is not directly fused to a nitrogen-containing aromatic heterocycle.

15 Claims, No Drawings

CURABLE COMPOSITION FOR INKJET FOR METAL-CONTAINING BASE MATERIAL, SOLDER RESIST, AND INKJET RECORDING METHOD

CROSS-REFERENCE TO RELATED APPLICATIONS

The entire disclosure of Japanese Patent Application No. 2023-166177, filed on Sep. 27, 2023, and No. 2024-034772, filed on Mar. 7, 2024, including description, claims, drawings and abstract is incorporated herein by reference.

BACKGROUND OF THE INVENTION

Technical Field

The present invention relates to a curable composition for inkjet for metal-containing base material, a solder resist, and an inkjet recording method. The present invention particularly relates to a curable composition for inkjet for metal-containing base material capable of suppressing changes in viscosity, particle size, and discoloration prevention performance after a lapse of time at high temperature, a solder resist excellent in coating film physical properties, and the like.

Description of Related Art

As disclosed in WO 2014/167671, there is a known technique of incorporating a nitrogen-containing aromatic heterocyclic compound such as melamine, benzotriazole and triazole into an alkali developable photoresist. Such a technique can promote the adhesion of the photoresist to a base material (for example, copper etc.) or suppress the discoloration of the base material.

On the other hand, it is known that an insulating film (solder resist) formed by applying and curing an ink on a printed wiring board in a printed circuit board to protect a circuit pattern is formed by an inkjet method. Specifically, an inkjet ink is applied to a printed wiring board, the ink is cured with an active ray, and then the ink is cured with heat. Hereinafter, the inkjet ink is also referred to simply as "ink."

JP 5986701 B discloses a technique of adding a nitrogen-containing aromatic heterocyclic compound to such an ink for a solder resist to promote the adhesion of the solder resist to copper.

SUMMARY OF THE INVENTION

However, the ink for a solder resist described in JP 5986701 B has a problem that suppression of discoloration of a coating film or a base material under the coating film in a curing step or a soldering step is not sufficient.

In addition, an inkjet ink is often used after being heated to lower the viscosity in order to obtain appropriate ink ejection. It is thus desired that the viscosity and particle size of the ink, the physical properties of the coating film including adhesiveness and hardness required as a solder resist, and the discoloration preventing performance do not change after a lapse of time at a high temperature. However, it has been more difficult to achieve such performance.

The present invention has been made in view of the above problems or situations. An object of the present invention is to provide a curable composition for inkjet for metal-containing base material capable of suppressing changes in viscosity and particle size after a lapse of time at high temperature and changes in discoloration prevention performance for a coating film or a base material under the coating film. Another object of the present invention is to improve coating film adhesiveness, hardness, heat resistance, and plating resistance after a lapse of time at high temperature in a solder resist and an inkjet recording method using the curable composition for inkjet for metal-containing base material.

To achieve the above objects, the present inventors have studied the causes of the above problems and the like. The present inventors have found that when a nitrogen-containing aromatic heterocyclic compound which has a polymerizable compound, a polymerization initiator, a pigment and a tertiary amine is contained in a curable composition for inkjet for metal-containing base material, it is possible to suppress changes in viscosity, particle size, and discoloration prevention performance of a coating film or a base material under the coating film after a lapse of time at high temperature. Furthermore, it has been found that a solder resist using such a curable composition for inkjet for metal-containing base material can attain improvements in adhesiveness, hardness, heat resistance and plating resistance even after a lapse of time at high temperature.

That is, the objects according to the present invention described above are achieved by the following means.

To achieve at least one of the abovementioned objects, according to another aspect of the present invention, a curable composition for inkjet for metal-containing base material reflecting one aspect of the present invention is provided: a curable composition for inkjet for metal-containing base material, including: a polymerizable compound; a polymerization initiator; and a pigment, and being cured by irradiation with an active ray, wherein the curable composition contains a nitrogen-containing aromatic heterocyclic compound having a tertiary amine

DETAILED DESCRIPTION

Hereinafter, one or more embodiments of the present invention will be described with reference to the drawings. However, the scope of the invention is not limited to the disclosed embodiments.

The curable composition for inkjet for metal-containing base material of the present invention is featured by that it is a curable composition for inkjet for metal-containing base material, including a polymerizable compound; a polymerization initiator; and a pigment, and being cured by irradiation with an active ray, wherein the curable composition contains a nitrogen-containing aromatic heterocyclic compound having a tertiary amine.

This feature is a technical feature common to or corresponding to the following embodiments.

In an embodiment of the present invention, it is preferable that the polymerizable compound is a polymerizable compound having a carboxy group, a hydroxy group, or an epoxy group, from the viewpoint of improving adhesiveness between a cured film such as a solder resist and a base material.

It is preferable that the nitrogen-containing aromatic heterocyclic compound is a 5-membered nitrogen-containing aromatic heterocyclic compound, from the viewpoint of improving the discoloration preventing performance after a lapse of time at high temperature.

It is preferable that the nitrogen-containing aromatic heterocyclic compound is a triazole compound, from the viewpoint of improving the discoloration preventing performance of the base material after a lapse of time at high temperature.

It is preferable that the triazole compound has a structure represented by the following General Formula (a), from the viewpoint of excellent plating resistance when formed into a cured film such as a solder resist.

General Formula (a)

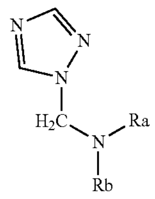

In the General Formula (a), Ra and Rb each represent an alkyl group having 1 to 20 carbon atoms.

It is preferable that the polymerizable compound having a carboxy group has a structure represented by the following General Formula (1), from the viewpoint that, since the polymerizable compound has a dicarboxylic acid, the adhesiveness between the solder resist and copper that is a base material becomes better.

General Formula (1)

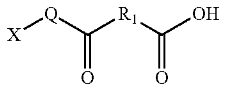

In the General Formula (1), X represents a substituent having at least one selected from an acryloyl group, a methacryloyl group, an allyl group, a vinyl group, and a derivative thereof at a terminal thereof;

Q represents an oxygen atom or $NR_4$, and $R_4$ represents a hydrogen atom, a substituted or unsubstituted alkyl group, or a substituted or unsubstituted aryl group; and $R_1$ represents an unsubstituted alkylene group having 1 to 6 carbon atoms.

It is preferable that the polymerizable compound having a hydroxy group is preferably an epoxy acrylate obtained by reacting (meth)acrylic acid with an epoxy compound, from the viewpoint that the adhesiveness between the solder resist and a base material becomes better.

It is preferable that the polymerizable compound having a carboxy group, a hydroxy group, or an epoxy group has any of a bisphenol structure, a cresol novolac structure, or a phenol novolac structure, from the viewpoint of improving heat resistance of the solder resist.

It is preferable that the polymerization initiator is thioxanthone, from the viewpoint of improving plating resistance of the curable composition for inkjet after a lapse of time at high temperature.

It is preferable that the curable composition for inkjet contains an N-oxyl or a nitrosamine as a polymerization inhibitor, from the viewpoint of improving the storage property of the ink.

The curable composition for inkjet for metal-containing base material of the present invention is suitably used for a solder resist.

The inkjet recording method of the present invention is an inkjet recording method including ejecting a curable composition for inkjet onto a base material, and curing the curable composition for inkjet with an active ray, wherein the curable composition for inkjet of the present invention is used as the curable composition for inkjet for metal-containing base material, and a base material containing a metal is used as the base material.

With this configuration, the physical properties of a solder resist made of the inkjet curable composition can be improved.

It is preferable that the method includes heating the base material at 140° C. or higher, from the viewpoint of improving the hardness of the solder resist is improved.

It is preferable that the method includes heating the curable composition for inkjet for metal-containing base material to 40° C. or higher in an inkjet head, from the viewpoint that the inkjet head ejection property can be further enhanced.

Hereinafter, the present invention and constituent elements thereof, and modes or aspects for carrying out the present invention will be described. In the present description, when two numbers are used to indicate a range of value before and after "o," these numbers are included in the range as the lower limit value and the upper limit value.

[Curable Composition for Inkjet]

The curable composition for inkjet for metal-containing base material of the present invention is featured by that it is a curable composition for inkjet, including a polymerizable compound, a polymerization initiator and a pigment, and being cured by irradiation with an active ray, wherein the curable composition contains a nitrogen-containing aromatic heterocyclic compound having a tertiary amine.

Hereinafter, the curable composition for inkjet for metal-containing base material of the present invention is also referred to simply as "curable composition for inkjet" or "ink."

<Nitrogen-Containing Aromatic Heterocyclic Compound Having Tertiary Amine>

In the present invention, the term "nitrogen-containing aromatic heterocyclic compound" refers to a nitrogen-containing aromatic heterocycle or a nitrogen-containing heteroaryl, and is a compound having an aromatic heterocycle containing at least one nitrogen atom as a ring-constituting atom. The atom constituting the aromatic heterocycle may contain a heteroatom such as an oxygen atom or a sulfur atom, in addition to carbon and nitrogen.

Specific examples of the nitrogen-containing aromatic heterocycle include an azole having a 5-membered ring and an azine having a 6-membered ring.

Specific examples of the azole include pyrrole, isoxazole and isothiazole each having one nitrogen atom, and pyrazole, imidazole, oxadiazole and thiadiazole each having two nitrogen atoms. Specific examples of the azole also include 1,2,3-triazole and 1,2,4-triazole each having three nitrogen atoms, and tetrazole having four nitrogen atoms.

Specific examples of the azine include pyridine having one nitrogen atom, pyrimidine, pyrazine and pyridazine each having two nitrogen atoms, and triazine having three nitrogen atoms.

It is preferable that the nitrogen-containing aromatic heterocycle is particularly a 5-membered nitrogen-containing aromatic heterocycle, from the viewpoint of improving the discoloration preventing performance after a lapse of time at high temperature.

Note that it is preferred that a benzene ring is not directly fused to the nitrogen-containing aromatic heterocycle in the present invention. A nitrogen-containing aromatic heterocycle to which a benzene ring is directly fused includes quinoline, isoquinoline, indole, benzotriazole, and benzimidazole, or the like.

Examples of the tertiary amine include trimethylamine, triethylamine, N,N-dimethylethylamine, N-methyl di-n-octylamine, bis(2-ethylhexyl)aminomethyl, N,N-bis(2-ethylhexyl)methylamine, and 1-methylpiperazine.

The nitrogen-containing aromatic heterocyclic compound having a tertiary amine according to the present invention is preferably a 5-membered nitrogen-containing aromatic heterocyclic compound, particularly preferably a triazole compound, from the viewpoint of improving the discoloration prevention performance after a lapse of time at high temperature.

Furthermore, it is preferable that the triazole compound has a structure represented by the following General Formula (a), from the viewpoint of excellent plating resistance of a solder resist.

General Formula (a)

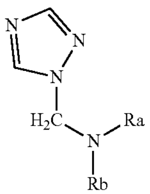

In the General Formula (a), Ra and Rb each represent an alkyl group having 1 to 20 carbon atoms. Ra is preferably an alkyl group having 1 to 10 carbon atoms. Rb is preferably an alkyl group having 1 to 10 carbon atoms.

Examples of the nitrogen-containing aromatic heterocyclic compound having a tertiary amine according to the present invention include the following compounds, but the present invention is not limited thereto. As the nitrogen-containing aromatic heterocyclic compound having a tertiary amine, the following compounds B-1 to B-10, in which a benzene ring is not directly fused to the nitrogen-containing aromatic heterocyclic ring, are preferred.

B-1

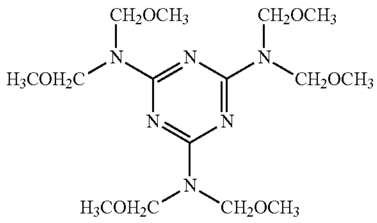

B-2

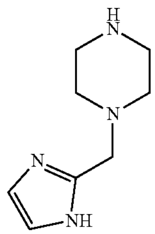

-continued

B-3

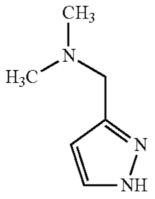

B-4

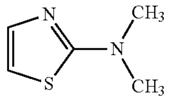

B-5

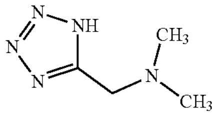

B-6

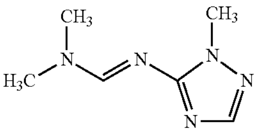

B-7

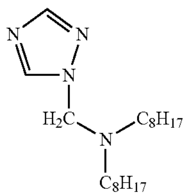

B-8

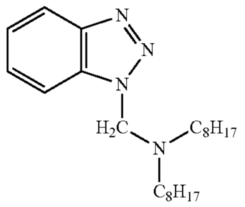

1-[N,N-bis(2-ethylhexyl)aminomethyl]benzotriazole

B-9

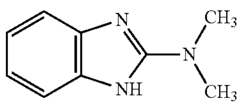

B-10

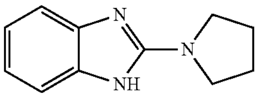

The content of the nitrogen-containing aromatic heterocyclic compound having a tertiary amine is preferably in a range of 0.05 to 5% by mass and more preferably in a range of 0.1 to 2.5% by mass based on the total mass of the curable composition for inkjet. When the content of the nitrogen-containing aromatic heterocyclic compound having a tertiary amine is within the above range, changes in viscosity, particle size, and discoloration prevention performance after a lapse of time at high temperature can be suppressed.

<Polymerizable Compound>

The polymerizable compound according to the present invention is a compound that is polymerized and crosslinked by irradiation with an active ray. The polymerizable compound may be a compound that is further polymerized and crosslinked by being heated after irradiation with an active ray.

Examples of the active ray include an electron beam, an ultraviolet ray, an α-ray, a γ-ray, and an X-ray. Among these, an ultraviolet ray and an electron beam are preferable, and an ultraviolet ray is more preferable.

The polymerizable compound may be a cationically polymerizable compound or a radically polymerizable compound, but is preferably a radically polymerizable compound. The radically polymerizable compound is a compound having a radically polymerizable ethylenically unsaturated bond.

The polymerizable compound according to the present invention is preferably a polymerizable compound having a carboxy group, a hydroxy group, or an epoxy group, from the viewpoint of improving adhesiveness between a solder resist and a base material and further enhancing the effect of suppressing discoloration before and after soldering.

The reason why the above effect is exhibited is not clear, but it is presumed that, since a carboxy group, a hydroxy group, or an epoxy group also interacts with the base material, the effect is attained by more densely coating the base material.

(Polymerizable Compound Having Carboxy Group)

The polymerizable compound having a carboxy group is preferably a radically polymerizable compound. One radically polymerizable compound may be contained or two or more radically polymerizable compounds may be contained in the ink.

Examples of the active ray-polymerizable compound having a carboxy group as the radically polymerizable compound include (meth)acrylic acid, carboxyethyl (meth)acrylate, 2-acryloyloxyethyl-phthalic acid, and 2-acryloyloxyethylhexahydrophthalic acid. Among these, the radically polymerizable compound is preferably (meth) acrylic acid or carboxyethyl acrylate. The carboxyethyl acrylate is also referred to as "carboxy group-containing polymerizable compound A-10" as described in Examples.

As used herein, "(meth)acrylate" means acrylate or methacrylate, and "(meth)acrylic" means acrylic or methacrylic.

The polymerizable compound having a carboxy group may be monofunctional or polyfunctional. From the viewpoint of preventing deterioration in adhesiveness due to curing shrinkage of the solder resist, the polymerizable compound having a carboxy group is preferably a compound having five or less functional groups.

Furthermore, it is preferable that the polymerizable compound having a carboxy group has a structure represented by the following General Formula (1), from the viewpoint that, since the polymerizable compound has a carboxylic acid, the adhesiveness between the solder resist and the base material becomes better.

General Formula (1)

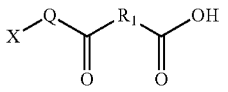

In the General Formula (1), X represents a substituent having at least one selected from an acryloyl group, a methacryloyl group, an allyl group, a vinyl group, and a derivative thereof at a terminal thereof;

Q represents an oxygen atom or $NR_4$, and $R_4$ represents a hydrogen atom, a substituted or unsubstituted alkyl group, or a substituted or unsubstituted aryl group; and $R_1$ represents an unsubstituted alkylene group having 1 to 6 carbon atoms.

The compound having the structure represented by the General Formula (1) has two carbonyl groups (C(=O)) via an unsubstituted alkylene group in the molecule. As a result, the two oxygen atoms contained in the two carbonyl groups and the metal atom form coordinate bonds, and thus the adhesiveness of the base material can be more sufficiently enhanced.

From the viewpoint of making the coordinate bonds between the two oxygen atoms and the metal atom more stable and enhancing the adhesiveness of the base material more sufficiently, $R_1$ is preferably an unsubstituted alkylene group having 1 to 6 carbon atoms. From the viewpoint of further enhancing the adhesiveness, $R_1$ is preferably an unsubstituted alkylene group having 1 or 2 carbon atoms. Accordingly, when the coordinate bond is formed, a ring structure is formed by the metal atom, the two oxygen atoms, and $R_1$ (alkylene group), and the coordinate bond is further stabilized. From the same viewpoint, Q is preferably an oxygen atom.

Furthermore, the polymerizable group which X has at a terminal thereof is preferably a (meth)acryloyl group. Since the (meth)acryloyl group has high reactivity, it tends to be polymerized and incorporated into the coating film. Thus, the compound having a (meth)acryloyl group as a polymerizable group can sufficiently exert the effect of improving the adhesiveness due to the carboxy group.

Examples of the compound having the structure represented by the General Formula (1) include the following compounds, but the present invention is not limited thereto.

A-1

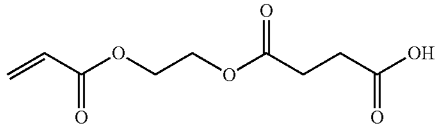

A-2

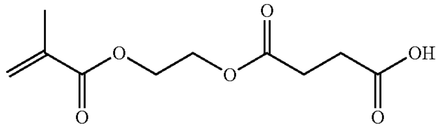

-continued

A-3

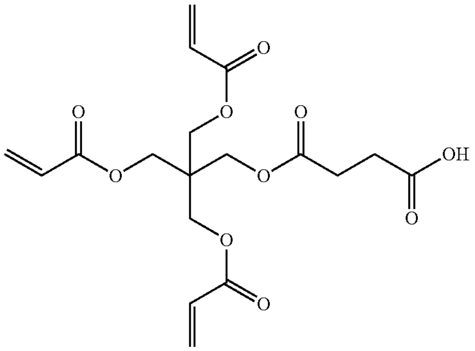

A-4

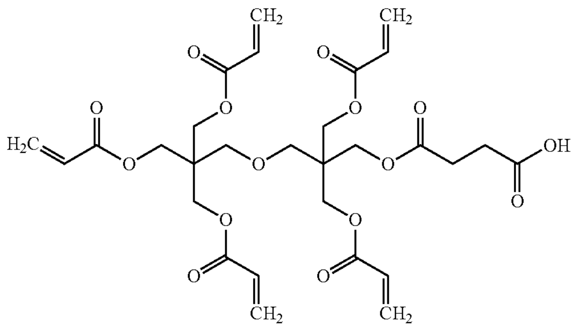

A-5

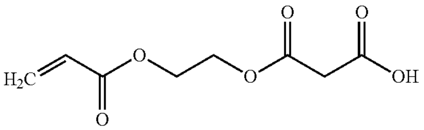

A-6

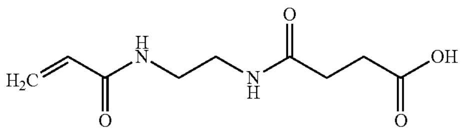

-continued

A-7

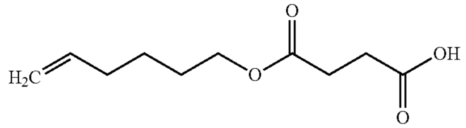

A-8

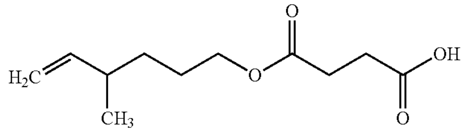

The polymerizable compound having a carboxy group may be a monomer or an oligomer, but is preferably a monomer. Note that, as used herein, a "monomer" refers to a polymerizable compound that is a monomer having a molecular weight of less than 700. The molecular weight can be measured by gel permeation chromatography.

(Polymerizable Compound Having Hydroxy Group)

The polymerizable compound having a hydroxy group is not particularly limited as long as it is a compound having a hydroxy group in the structure thereof. Specific examples of the polymerizable compound having a hydroxy group include a hydroxyalkyl (meth)acrylate and a hydroxy (meth) acrylate having an alicyclic structure.

Examples of the hydroxyalkyl (meth)acrylate include 2-hydroxyethyl (meth)acrylate, 2-hydroxypropyl (meth) acrylate, and 4-hydroxybutyl (meth)acrylate. The 4-hydroxybutyl (meth)acrylate is a hydroxy group-containing polymerizable compound A-11 described below.

Examples of the hydroxy (meth)acrylate having a cycloaliphatic structure include 1,4-cyclohexanedimethanol mono (meth)acrylate.

Furthermore, as the polymerizable compound having a hydroxy group, an epoxy acrylate obtained by reacting a (meth)acrylic acid with an epoxy compound can also be used. As the epoxy acrylate, a commercially available product can be used. Examples of the commercially available product include EPOXY ESTER 70PA (manufactured by Kyoeisha Chemical Co., Ltd.), EPOXY ESTER 200PA (manufactured by Kyoeisha Chemical Co., Ltd.), and DENACOL ACRYLATE DA-111 (manufactured by Nagase ChemteX Corporation). Epoxy Ester 70PA (manufactured by Kyoeisha Chemical Co., Ltd.) is a hydroxy group-containing polymerizable compound A-12 described below. Among these, an epoxy acrylate is preferable. The epoxy acrylate is preferable in that the adhesiveness between the solder resist and copper that is a base material becomes better.

A-11

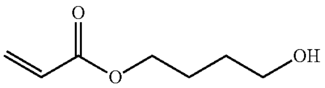

A-12

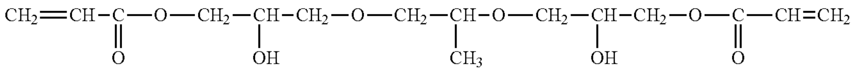

(Polymerizable Compound Having Epoxy Group)

The polymerizable compound having an epoxy group is not particularly limited as long as it is a compound having an epoxy group in the structure thereof. Specific examples of the polymerizable compound having an epoxy group include an aliphatic alcohol-based epoxy, an aliphatic polyhydric alcohol-based epoxy, and a phenol-based epoxy.

Other examples include an epoxy (meth)acrylate such as the following.

A-21

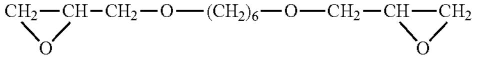

A-22

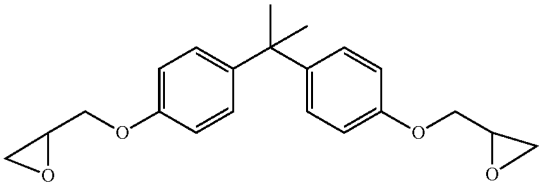

It is preferable that the polymerizable compound having a carboxy group, a hydroxy group, or an epoxy group has any of a bisphenol structure, a cresol novolac structure, or a phenol novolac structure, from the viewpoint of improving heat resistance of a cured film such as a solder resist.

Examples of the bisphenol structure include a bisphenol A-type structure and a bisphenol F-type structure.

Examples of the polymerizable compound having any one of a bisphenol structure, a cresol novolac structure, and a phenol novolac structure include the following compounds in addition to the epoxy group-containing polymerizable compound A-22 described above.

Cresol-novolac epoxy resin ($R = CH_3$)

Phenol novolac epoxy resin ($R = H$)

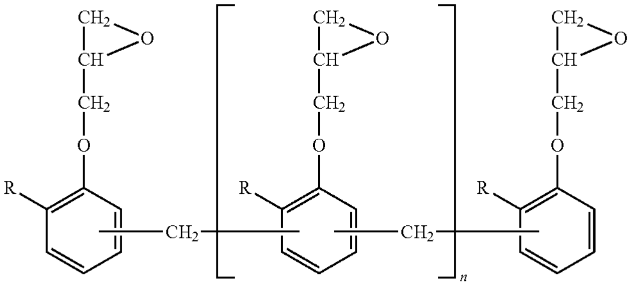

$n \leq 2$ $R = H$ or $CH_3$

Bisphenol A diglycidyl ether acrylic acid adduct

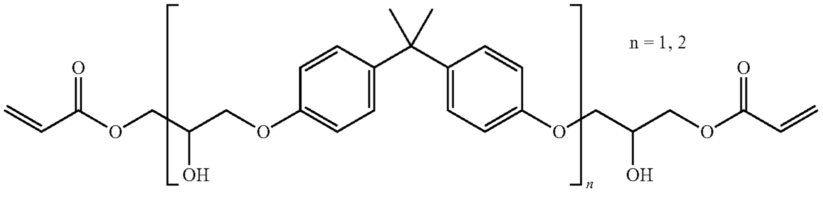

$n = 1, 2$

The content of the polymerizable compound is preferably in a range of 20 to 99% by mass, and more preferably in a range of 30 to 95% by mass with respect to the total mass of the curable composition for inkjet. When the content of the polymerizable compound is within the above range, the improvements of coating film adhesiveness and hardness can be attained in a solder resist and an inkjet recording method.

<Polymerization Initiator>

The polymerization initiator according to the present invention is a compound that initiates polymerization and crosslinking of the polymerizable compound upon irradiation with an active ray.

The polymerization initiator can be a radical polymerization initiator when the ink contains a radically polymerizable compound, and can be a cationic polymerization initiator when the ink contains a cationically polymerizable compound. Examples of the radical polymerization initiator include an intramolecular bond cleavage type radical polymerization initiator and a hydrogen abstraction type radical polymerization initiator.

Examples of the intramolecular bond cleavage type radical polymerization initiator include acetophenone-based initiators such as diethoxyacetophenone, 2-hydroxy-2-methyl-1-phenylpropan-1-one, benzyldimethylketal, 1-(4-isopropylphenyl)-2-hydroxy-2-methylpropan-1-one, 4-(2-hydroxyethoxy)phenyl-(2-hydroxy-2-propyl)ketone, 1-hydroxycyclohexyl-phenylketone, 2-methyl-2-morpholino(4-methylthiophenyl)propan-1-one, and 2-benzyl-2-dimethylamino-1-(4-morpholinophenyl)-butanone; benzoin-based initiators such as benzoin, benzoin methyl ether, and benzoin isopropyl ether; acylphosphine oxide-based initiators such as bis-2,4,6-trimethylbenzoin diphenylphosphine oxides; and benzyl, and methylphenyl glyoxy esters.

Examples of commercially available products of the acetophenone-based initiators include Omnirad 907 (manufactured by Igm Resins B.V.) (molecular weight 279) and Omnirad 379 (manufactured by Igm Resins B.V.) (molecular weight 381).

Examples of commercially available products of the acylphosphine-based initiators include Omnirad TPO H (manufactured by Igm Resins B.V.) (molecular weight 348) and Omnirad 819 (manufactured by Igm Resins B.V.) (molecular weight 419).

Examples of the hydrogen abstraction type radical polymerization initiator include benzophenone-based initiators such as benzophenon, methyl o-benzoylbenzoate, 4-phenylbenzophenone, 4,4'-dichlorobenzophenone, hydroxybenzophenone, 4-benzoyl-4'-methyl-diphenyl sulfide, acrylated benzophenon, 3,3',4,4'-tetra(t-butylperoxycarbonyl)benzophenon, and 3,3'-dimethyl-4-methoxybenzophenone; thioxanthone-based initiators such as 2-isopropylthioxanthone, 2,4-dimethylthioxanthone, 2,4-diethylthioxanthone, and 2,4-dichlorothioxanthone; aminobenzophenone-based initiators such as Michler's ketone and 4,4'-diethylaminobenzophenone; 10-butyl-2-chloroacridone, 2-ethylanthraquinone, 9,10-phenanthrenequinone, and camphorquinone.

Examples of commercially available products of the thioxanthone-based initiators include 2-isopropylthioxanthone (Speedcure ITX (manufactured by Sartomer) (molecular weight 254)) and 2,4-diethylthioxanthone (Speedcure DETX (manufactured by Sartomer) (molecular weight 268)).

Examples of the cationic polymerization initiator include a photoacid generator.

Examples of the photoacid generator include $B(C_6F_5)_4^-$, $PF_6^-$, $AsF_6^-$, $SbF_6^-$, and $CF_3SO_3^-$ salts of aromatic onium compounds containing diazonium, ammonium, iodonium, sulfonium, phosphonium, and the like; sulfonates that generate sulfonic acid; halides that photogenerate hydrogen halides; and iron-allene complexes.

It is preferable that the polymerization initiator according to the present invention is thioxanthone, from the viewpoint of improving plating resistance of the solder resist.

The content of the polymerization initiator is preferably in a range of 1 to 10% by mass, and more preferably in a range of 2 to 8% by mass with respect to the total mass of the curable composition for inkjet.

<Gelling Agent>

The curable composition for inkjet of the present invention may contain a gelling agent.

The gelling agent causes the ink to be isolated in a heated state and gelated in the vicinity of room temperature. Thus, it is possible to enhance the pinning property of an ink by ejecting an ink that has been heated and isolated from an inkjet head, and temporarily solidifying the ink that is landed on a recording medium, cooled and gelated. Accordingly, wet-spreading of the ink is suppressed, and adjacent dots are less likely to be integrated, so that a higher-definition pattern can be formed.

In addition, when the curable composition for inkjet contains a gelling agent, the hydrophobicity of the formed solder resist is enhanced, and thus the water absorption of the solder resist can be further suppressed. Thus, the occurrence of ion migration under a high-humidity environment can be further suppressed, and a decrease in insulating properties of the solder resist can be sufficiently suppressed.

The gelling agent is preferably a compound that dissolves in a polymerizable compound contained in an ink at a temperature higher than the gelation temperature of the ink and crystallizes in the ink at a temperature equal to or lower than the gelation temperature of the ink.

Here, the "gelation temperature" means a temperature at which the viscosity of the ink sharply changes due to the phase transition of the ink from sol to gel when the ink which is isolated or liquefied by heating is cooled. Specifically, when a isolated or liquefied ink is cooled while measuring the viscosity with a rheometer (e.g., MCR300, manufactured by Anton Paar GmbH), the temperature at which the viscosity sharply increases can be defined as the gelation temperature of the ink.

It is preferable that the gelling agent is crystallized in an ink at a temperature equal to or lower than the gelation temperature of the ink to form a structure in which the radically polymerizable compound is enclosed in a three dimensional space formed by the gelling agent crystallized in a plate shape. Such a structure is hereinafter referred to as a "card house structure." When the card house structure is formed, a liquid, active ray-polymerizable compound is held in the space. Thus, dots formed by adhesion of the ink to a recording medium are less likely to wet-spread, and the pinning property of the ink is further enhanced. Thus, dots formed by adhesion of the ink to the recording medium are unlikely to coalesce with each other.

Examples of the gelling agent that can more easily form a card house structure by crystallization include aliphatic a ketone, an aliphatic ester, a petroleum-based wax, a plant-based wax, an animal-based wax, and a mineral-based wax. Additional examples of the gelling agent above include a hydrogenated castor oil, a modified wax, a higher fatty acid, a higher alcohol, a hydroxystearic acid, and a fatty acid amide such as an N-substituted fatty acid amide and a special fatty acid amide. Further examples of the gelling agent above include a higher amine, a sucrose fatty acid ester, a synthetic wax, dibenzylidene sorbitol, a dimer acid, and a dimer diol.

Examples of the aliphatic ketone include dilignoceryl ketone, dibehenyl ketone, distearyl ketone, dieicosyl ketone, dipalmityl ketone, dilauryl ketone, dimyristyl ketone, myristyl palmityl ketone, and palmityl stearyl ketone.

Examples of the aliphatic ester include fatty acid esters of monoalcohols such as behenyl behenate, icosyl icosanoate, stearyl stearate, palmityl stearate, myristyl myristate, cetyl myristate, and oleyl palmitate; and fatty acid esters of polyhydric alcohols such as glycerin fatty acid ester, sorbitan fatty acid ester, propylene glycol fatty acid ester, ethylene glycol fatty acid ester, and polyoxyethylene fatty acid ester.

Examples of commercially available products of the aliphatic ester include EMALEX series (manufactured by Nihon Emulsion Co., Ltd. ("EMALEX" is a registered trademark of the company)), and RIKEMAL series and POEM series (manufactured by Riken Vitamin Co., Ltd.). "RIKEMAL" and "POEM" are both registered trademarks of Riken Vitamin Co., Ltd.

Examples of the higher fatty acid include behenic acid, arachidic acid, stearic acid, palmitic acid, myristic acid, lauric acid, oleic acid, and erucic acid.

Examples of the higher alcohol include stearyl alcohol and behenyl alcohol.

Among these, the gelling agent is preferably an aliphatic ketone, an aliphatic ester, a higher fatty acid, or a higher alcohol, from the viewpoint of further improving the pinning property. The gelling agent is more preferably an aliphatic ketone represented by the following formula (G1) or an aliphatic ester represented by the following formula (G2). One gelling agent may be included, or two or more gelling agents may be included in combination.

$R_a$—CO—$R_b$ Formula (G1):

$R_c$—COO—$R_d$ Formula (G2):

In formula (G1), $R_a$ and $R_b$ each independently represent a linear hydrocarbon group having 12 or more and 26 or less carbon atoms and optionally having a branched chain.

In formula (G2), $R_c$ and $R_d$ each independently represent a linear hydrocarbon group having 12 or more and 26 or less carbon atoms and optionally having a branched chain.

In the formulae (G1) and (G2), when $R_a$ to $R_d$ have 12 or more carbon atoms, the crystallinity of the gelling agent represented by the formula (G1) or (G2) is further enhanced. Furthermore, more sufficient space is generated in the card house structure. Thus, the polymerizable compound is likely to be sufficiently enclosed in the space, and the pinning property of the ink is improved.

When $R_a$ to $R_d$ have 26 or less carbon atoms, excessive increase of the melting point of the gelling agent represented by the formula (G1) or (G2) can be prevented. Thus, the solation temperature of an ink containing the gelling agent is not excessively increased, and the ink can be ejected while the heating temperature of the ink is lowered.

Examples of the aliphatic ketone represented by the formula (G1) include dilignoceryl ketone (number of carbon atoms: 23-24), dibehenyl ketone (number of carbon atoms: 21-22), distearyl ketone (number of carbon atoms: 17-18), dieicosyl ketone (number of carbon atoms: 19-20), dipalmityl ketone (number of carbon atoms: 15-16), dimyristyl ketone (number of carbon atoms: 13-14), dilauryl ketone (number of carbon atoms: 11-12), lauryl myristyl ketone (number of carbon atoms: 11-14), lauryl palmityl ketone (11-16), myristyl palmityl ketone (13-16), myristyl stearyl ketone (13-18), myristyl behenyl ketone (13-22), palmityl stearyl ketone (15-18), palmityl behenyl ketone (15-22), and stearyl behenyl ketone (17-22). The number of carbon atoms in the above parentheses represents the number of carbon atoms of each of two hydrocarbon groups separated by a carbonyl group.

Examples of commercially available products of the compound represented by the formula (G1) include 18-Pentatriacontanon and Hentriacontan-16-on (all manufactured by Alfa Aesar), and KAO WAX T1 (manufactured by Kao Corporation).

Examples of the aliphatic ester represented by the formula (G2) include behenyl behenate (number of carbon atoms: 21-22), icosyl icosanoate (number of carbon atoms: 19-20), stearyl stearate (number of carbon atoms: 17-18), palmityl stearate (number of carbon atoms: 17-16), lauryl stearate (number of carbon atoms: 17-12), cetyl palmitate (number of carbon atoms: 15-16), stearyl palmitate (number of carbon atoms: 15-18), myristyl myristate (number of carbon atoms: 13-14), cetyl myristate (number of carbon atoms: 13-16), octyldodecyl myristate (number of carbon atoms: 13-20), stearyl oleate (number of carbon atoms: 17-18), stearyl erucate (number of carbon atoms: 21-18), stearyl linoleate (number of carbon atoms: 17-18), behenyl oleate (number of carbon atoms: 18-22), and arachidyl linoleate (number of carbon atoms: 17-20). The number of carbon atoms in the above parentheses represents the number of carbon atoms of each of two hydrocarbon groups separated by an ester group.

Examples of commercially available products of the aliphatic ester represented by the formula (G2) include UNISTER M-2222SL, SPERMACETI, Nissan Electol WEP-2 and NISSAN ELECTOL WEP-3 (all manufactured by Nof Corp., "UNISTER" and "NISSAN ELECTOL" are registered trademarks of the company), EXCEPARL SS and EXCEPARL MY-M (all manufactured by Kao Corp., "EXCEPARL" is a registered trademark of the company), EMALEX CC-18 and EMALEX CC-10 (manufactured by Nihon Emulsion Co., Ltd., "EMALEX" is a registered trademark of the company), and AMREPS PC (manufactured by KOKYU ALCOHOL KOGYO CO., LTD., "AMREPS" is a registered trademark of the company). Since these commercially available products are often a mixture of two or more kinds, they may be separated or purified as necessary to be contained in the ink.

The content of the gelling agent is preferably 1 to 10% by mass, and more preferably in a range of 1 to 5% by mass based on the total mass of the curable composition for inkjet. When the content is 1% by mass or more, the water absorption of the solder resist can be further suppressed, and the decrease in insulating properties under a high-humidity environment can be further suppressed. When the content is 10% by mass or less, the solubility of the gelling agent in the polymerizable compound can be further enhanced.

<Others>

The curable composition for inkjet of the present invention contains a pigment which is a colorant to the extent that the effects of the present invention are exhibited.

(Colorant)

The colorant is a dye or a pigment. A pigment is preferred from the viewpoint of increasing the heat resistance of the colorant and preventing discoloration of the cured film after aging at high temperatures of the composition.

The pigment may be selected from, for example, yellow pigment, red pigment, blue pigment, black pigment and white pigment, in accordance with a color or the like of an image to be formed.

Examples of the yellow pigment include Pigment Yellow (PY) 1, 3, 12, 13, 14, 17, 34, 35, 37, 55, 74, 81, 83, 93, 94, 95, 97, 108, 109, 110, 137, 138, 139, 153, 154, 155, 157, 166, 167, 168, 180, 185, and 193. Of these, PY185 and PY150 are preferred from the viewpoint of enhancing the heat resistance of the pigment and preventing discoloration of the cured film.

Examples of the red pigment include Pigment Red (PR) 3, 5, 19, 22, 31, 38, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, and 257; Pigment Violet (PV) 3, 19, 23, 29, 30, 37, 50, and 88; and Pigment Orange (PO) 13, 16, 20, and 36. Among these, PR122 and PV19 are preferred from the viewpoint of increasing the heat resistance of the pigments and preventing the discoloration of the cured film.

Examples of the blue pigment include Pigment Blue (PB) 1, 15, 15:1, 15:2, 15:3, 15:4, 15:6, 16, 17:1, 22, 27, 28, 29, 36, and 60. Among these, PB15:3 and PB15:4 are preferred from the viewpoint of increasing the heat resistance of the pigment and preventing discoloration of the coating film.

Examples of green pigment include C. I. Pigment Green7, PG26, PG36, and PG50. "PG" refers to C. I. Pigment Green.

Examples of the black pigment include C. I. Pigment Black 7, PBk26, and PBk28. "PBk" refers to C. I. Pigment Black.

The white pigment may be any pigment that imparts a white color to a cured film obtained by curing a white ink. Examples of the white pigment include an inorganic pigment such as titanium oxide, zinc oxide, calcium carbonate, barium sulfate, and aluminum hydroxide. Among these, titanium oxide is preferable.

The crystal form of the titanium oxide may be any of a rutile type, an anatase type, or a brookite type. From the viewpoint of facilitating reducing the particle size of the white pigment, the crystal form is preferably an anatase type having a small specific gravity. From the viewpoint of further enhancing the concealing property of an image to be formed, the crystal form is preferably a rutile type having a large refractive index in the visible light region.

The content of the colorant is preferably 0.1 to 10% by mass and more preferably 0.3 to 5% by mass based on the total mass of the curable composition. When the colorant is a pigment, the content of the pigment is preferably 20% by mass or less, and more preferably 10% by mass or less based on the total mass of the curable composition, from the viewpoint of reducing the amount of impurities in the curable composition.

(Synergist)

The curable composition for inkjet of the present invention may contain a synergist.

The synergist is a compound having an anchor portion that adsorbs to a pigment and a polar portion that adsorbs to a pigment dispersant. In the ink, the anchor portion of the synergist is adsorbed to the pigment and the polar portion is adsorbed to the pigment dispersant. Thus, the pigment dispersant can adhere to the pigment via the synergist and is less likely to be dissociated from the pigment. Accordingly, the dispersion stability of the ink can be further improved.

Furthermore, as a result of the studies by the present inventors, it has been found that when the amine value of a pigment dispersant contained in an ink is higher than the acid value thereof, the dispersion stability of the ink can be significantly enhanced by adding a synergist to the ink.

Examples of the synergist include a pigment derivative. The pigment derivative is a compound obtained by introducing a polar group into a pigment serving as a mother core. That is, in the pigment derivative, the pigment serving as a mother core serves as an anchor portion, and the polar group serves as a polar portion.

Examples of the polar group include a chlorine group, a sulfonyl group, a sulfonylamide group, a carboxy group, a carboxamide group, an amino group, an amide group, an aminomethyl group, an imide group, an imidomethyl group, a phthalimide group, a phthalimidomethyl group, a nitro group, a cyano group, and a phosphate group. Among these, a carboxy group, a sulfonyl group, a nitro group, a phosphate group, an amino group, and an amide group are preferable.

Examples of the pigment derivative include an azo derivative, a quinoline derivative, and a pyrazole derivative.

The method of synthesizing the pigment derivative is not particularly limited. As the synthesis method, for example, in the case of introducing a sulfonyl group as a polar group into an azo-based pigment, fuming sulfuric acid, concentrated sulfuric acid, or the like is added to a pigment-dispersed solution, and the mixture is heated to a temperature in the range of 60 to 200° C. and stirred. Thereafter, a volatile component is removed, and thus a pigment in which a sulfonyl group is introduced into an azo-based pigment can be obtained.

Examples of commercially available products of the pigment derivative include Solsperse 5000S, Solsperse 12000S, and Solsperse 22000 (manufactured by Lubrizol Corporation).

The synergist may be a water-based dye having an acidic group or a basic group.

Examples of the acidic group include a carboxy group, a sulfonyl group, and a phosphate group. Among these, a sulfonyl group is preferable.

Examples of the basic group include an amino group and an imino group.

Examples of the water-based dye include C. I. Acid Yellow 3, C. I. Acid Yellow 11, C. I. Acid Yellow 23, and Direct Red 21.

The content of the synergist is preferably in a range of 1 to 10% by mass and more preferably in a range of 2 to 8% by mass with respect to the total mass of the pigment. When the content of the synergist is 1% by mass or more relative to the total mass of the pigment, the dispersion stability of the ink can be further improved. When the content of the synergist is 10% by mass or less based on the total mass of the pigment, it is possible to further suppress the color fluctuation of the cured film by increasing the ratio of the pigment.

(Pigment Dispersant)

When the ink of the present invention contains a pigment, the ink may contain a pigment dispersant.

Examples of the pigment dispersant include hydroxy group-containing carboxylic acid ester, salt of long-chain polyaminoamide and high molecular weight acid ester, salts of high molecular weight polycarboxylic acids, salt of long-chain polyaminoamide and polar acid ester, high molecular weight unsaturated acid ester, high-molecular-weight copolymers, modified polyurethane, modified polyacrylate, polyether ester type anionic surfactant, naphthalenesulfonic acid formalin condensate salt, aromatic sulfonic acid formalin condensate salt, polyoxyethylene alkyl phosphate ester, polyoxyethylene nonylphenyl ether, and stearylamine acetate.

Examples of commercially available products of the pigment dispersant include Solsperse® series manufactured by Avecia Inc. and PB series manufactured by Ajinomoto Fine-Techno Co., Inc.

The content of the pigment dispersant is preferably in a range of 1 to 50% by mass based on the mass of the pigment.

The pigment dispersant may have an acid value or an amine value. In particular, it is desirable that the amine value is larger than the acid value and the acid value is 20 mg/KOH or less. Thus, the dispersion stability of an ink containing the pigment dispersant can be improved.

Examples of the pigment dispersant having an amine value greater than an acid value include BYK-JET-9151 (manufactured by BYK-Chemie GmbH) and EFKA7701 (manufactured by Basf SE). One pigment dispersant may be contained or two or more pigment dispersants may be contained in the ink.

The acid value of the pigment dispersant is preferably 20 mg/KOH or less, and more preferably 10 mg/KOH or less. The lower limit value of the acid value is not particularly limited and can be set to 0 mg/KOH or more.

It is sufficient that the amine value of the pigment dispersant is greater than the acid value. From the viewpoint of further enhancing the dispersion stability of the ink, the amine value is preferably 10 mg/KOH or more, and more preferably 20 mg/KOH or more. The upper limit value of the amine value is not particularly limited, but can be set to, for example, 60 mg/KOH or less.

Furthermore, from the viewpoint of further enhancing the dispersion stability of the ink, the difference between the amine value and the acid value of the pigment dispersant is preferably within a range of 1 to 40 mg/KOH, and more preferably within a range of 10 to 40 mg/KOH.

The acid value and the amine value can be measured by a potentiometric titration method. For example, it can be measured by the method described in Journal of the Japan Society of Colour Material Vol. 61, No. 12, Pages 692-698, December 1988.

The acid value can be determined from the amount of 0.01 mol/L potassium methoxide-methylisobutyl ketone/methanol (4:1 v/v) solution required for neutralization when a solution of 1 g of pigment dispersant dissolved in 100 mL of methyl isobutyl ketone (MIBK) is subjected to potentiometric titration with the potassium methoxide-methylisobutyl ketone/methanol solution.

The amine value can be determined from the amount of 0.01 mol/L methyl isobutyl ketone (MIBK) perchlorate solution required for neutralization when a solution of 1 g of pigment dispersant dissolved in 100 mL of MIBK is subjected to potentiometric titration with the MIBK perchlorate solution.

(Surfactant)

The curable composition for inkjet of the present invention may contain a surfactant.

Examples of the surfactant include anionic surfactants such as dialkylsulfosuccinates, alkylnaphthalenesulfonates, and fatty acid salts.

Additional examples of the surfactant include nonionic surfactants such as polyoxyethylene alkyl ethers, polyoxyethylene alkyl allyl ethers, acetylene glycols, and polyoxyethylene-polyoxypropylene block copolymers.

Further examples of the surfactant include cationic surfactants such as alkylamine salts and quaternary ammonium salts, and silicone-based and fluorine-based surfactants.

Examples of commercially available products of the silicone-based surfactants include Tego rad 2250 (manufactured by Evonik Industries AG), KF-351A, KF-352A, KF-642, and X-22-4272 (manufactured by Shin-Etsu Chemical Co., Ltd.), BYK307, BYK345, BYK347, and BYK348 (manufactured by BYK-Chemie GmbH ("BYK" is a registered trademark of the company)), and TSF4452 (manufactured by Momentive Performance Materials, Inc.).

Examples of commercially available products of fluorine-based surfactants include Megafac F (manufactured by DIC Corporation ("Megafac" is a registered trademark of the company)), Surflon (manufactured by AGC SEIMI CHEMICAL CO., LTD. ("Surflon" is a registered trademark of the company)), Fluorad FC (manufactured by 3M Company ("Fluorad" is a registered trademark of the company)), Monflor (manufactured by Imperial Chemical Industries), Zonyls (manufactured by E. I. du Pont de Nemours and Compan), Licowet VPF (manufactured by Lubewerke Hoechst), and FTERGENT (manufactured by NEOS COMPANY LIMITED ("FTERGENT" is a registered trademark of the company)).

The content of the surfactant with respect to the total mass of the curable composition is not particularly limited as long as the effect of the present invention is exhibited, but for example, it can be 0.001% by mass or more and less than 1.0% by mass.

(Polymerization Inhibitor)

It is preferable that the inkjet curable composition of the present invention further contains a radical polymerization inhibitor from the viewpoint of storage stability.

Examples of the radical polymerization inhibitor include phenolic hydroxy group-containing compounds, quinones or hydroquinones, phenothiazine, N-oxyls, and nitrosamines. From the viewpoint of enhancing the storage stability at a higher temperature and the discoloration prevention performance, the radical polymerization inhibitor is preferably an N-oxyl or a nitrosamine.

Examples of the phenolic hydroxy group-containing compound include 2,6-di-tert-butylphenol, 2,4-di-tert-butylphenol, 2-tert-butyl 4,6-dimethylphenol, 2,6-di-tert-butyl-4-methylphenol, 2,4,6-tri-tert-butylphenol, 2,6-di-t-butyl-p-cresol (butylated hydroxytoluene: BHT), 4-methoxyphenol, and 2-methoxy-4-methylphenol.

Examples of the quinones or hydroquinones include hydrochinone, methoxyhydroquinone, benzoquinone, 1,4-naphthoquinone, p-tert-butylcatechol, hydrochinone, and monomethyl ether (MEHQ).

Examples of the N-oxyls (compounds having a nitroxyl- or N-oxyl-group, at least one >N—O-group) include piperidine N-oxyl compounds. Preferred are free radical compounds of piperidine N-oxyl.

Preferred examples of the N-oxyls include 4-hydroxy-2,2,6,6-tetramethyl-piperidin-N-oxyl, 4-oxo-2,2,6,6-tetramethyl-piperidin-N-oxyl, 4-methoxy-2,2,6,6-tetramethyl-piperidin-N-oxyl, 4-acetoxy-2,2,6,6-tetramethyl-piperidin-N-oxyl, 2,2,6,6-tetramethyl-piperidin-N-oxyl, Uvinul 4040P from BASF Aktiengesellschaft, 4,4',4"-tris-(2,2,6,6-tetramethyl-piperidin-N-oxyl)phosphite, 3-oxo-2,2,5,5-tetramethyl-pyrrolidin-N-oxyl, 1-oxyl-2,2,6,6-tetramethyl-4-methoxypiperidine, 1-oxyl-2,2,6,6-tetramethyl-4-trimethylsilyloxypiperidine, 1-oxyl-2,2,6,6-tetramethylpiperidin-4-yl-2-ethylhexanoate, 1-oxyl-2,2,6,6-tetramethylpiperidin-4-yl-sebacate, 1-oxyl-2,2,6,6-tetramethylpiperidin-4-yl-stearate, 1-oxyl-2,2,6,6-tetramethylpiperidin-4-yl-benzoate, 1-oxyl-2,2,6,6-tetramethylpiperidin-4-yl-(4-t-butyl)benzoate, bis-(1-oxyl-2,2,6,6-tetramethylpiperidin-4-yl)succinate, bis-(1-oxyl-2,2,6,6-tetramethylpiperidin-4-yl)adipate, 1,10-decanedioic acid bis-(1-oxyl-2,2,6,6-tetramethylpiperidin-4-yl)ester, bis-(1-oxyl-2,2,6,6-tetramethylpiperidin-4-yl)n-butylmalonate, bis-(1-oxyl-2,2,6,6-tetramethylpiperidin-4-yl)phthalate, bis-(1-oxyl-2,2,6,6-tetramethylpiperidin-4-yl)isophthalate, bis-(1-oxyl-2,2,6,6-tetramethylpiperidin-4-yl)terephtalate, bis-(1-oxyl-2,2,6,6-tetramethylpiperidin-4-yl) hexahydroterephthalate, N,N'-bis-(1-oxyl-2,2,6,6-tetramethylpiperidin-4-yl)adipamide, N-(1-oxyl-2,2,6,6-tetramethylpiperidin-4-yl)caprolactam, N-(1-oxyl-2,2,6,6-tetramethylpiperidin-4-yl)dodecylsuccinimide, 2,4,6-tris-[N-butyl-N-(1-oxyl-2,2,6,6-tetramethylpiperidin-4-yl] triazine, N,N'-bis-(1-oxyl-2,2,6,6-tetramethylpiperidin-4-yl)-N,N'-bis-formyl-1,6-diaminohexane, and 4,4'-ethylene-bis-(1-oxyl-2,2,6,6-tetramethylpiperazin-3-one).

Examples of commercially available products of the N-oxyls include Irgastab UV-10 (manufactured by BASF Japan Ltd).

Examples of the nitrosamines include salts of N-nitrosophenylhydroxylamine.

Examples of the salt of N-nitrosophenylhydroxylamine include an N-nitrosophenylhydroxylamine ammonium salt and N-nitroso-N-phenylhydroxylamine aluminum (NPHA).

The amount of the polymerization inhibitor is not particularly limited. The content of each of the polymerization inhibitors is preferably in the range of 0.01 to 1% by mass based on 100% by mass of the curable composition for inkjet.

(Antioxidant)

The curable composition for inkjet of the present invention may contain an antioxidant to further enhance the effect of preventing discoloration of a coating film.

Examples of the antioxidant include a hindered phenol compound such as n-octadecyl-3-(3',5'-di-t-butyl-4'-hydroxyphenyl)-propionate, n-octadecyl-3-(3'-methyl-5'-t-butyl-4'-hydroxyphenyl)-propionate, n-tetradecyl-3-(3'5'-di-t-butyl-4'-hydroxyphenyl)-propionate,1,6-hexanediol-bis-[3-(3,5-di-t-butyl-4-hydroxyphenyl)-propionate], 1,4-butanediol-bis-[3-(3,5-di-t-butyl-4-hydroxyphenyl)-propionate], triethylene glycol-bis-[3-(3-t-butyl-5-methyl-4-hydroxyphenyl)-propionate], tetrakis-[methylene-3-(3',5'-di-t-butyl-4'-hydroxyphenyl) propionate]methane, 3,9-bis [2-{3-(3-t-butyl-4-hydroxy-5-methylphenyl)propionyloxy)-1,1-dimethylethyl]2,4,8,10-tetraoxaspiro(5,5)undecane, N,N'-bis-3-(3'5'-di-t-butyl-4-hydroxyphenol)propionylhexamethylene diamine, N,N'-tetramethylenebis-3-(3'-methyl-5'-t-butyl-4-hydroxyphenol)propionyl diamine, N,N'-bis-[3-(3,5-di-t-butyl-4(-hydroxyphenol)propionyl]hydrazine, N-salicyloyl-N'-salicylidenehydrazine, 3-(N-salicyloyl) amino-1,2,4-triazole, and N,N'-bis[2-[3-(3,5-dibutyl-4-hydroxyphenyl) propionyloxy]ethyl]oxyamide; a sulfur-based antioxidant such as didodecyl-3,3'-thiodipropionate, ditetradecyl-3,3'-thiodipropionate, dioctadecyl-3,3'-thiodipropionate; ditridecyl-3,3'-thiodipropionate, pentaerythrythyl tetrakis(3-dodecylthiopropionate), pentaerythrythyl tetrakis(3-tetadecylthiopropionate), pentaerythrythyl tetrakis(3-tridecylthiopropionate), dilauryl-3,3-thiodipropionate, dimyristyl-3,3-thiodipropionate, distearyl-3,3-thiodipropionate, pentaerythryl tetrakis(3-laurylthiodipropionate, 2-mercapto-benzoimidazole, laurylstearylthiodipropionate, zinc salt of 2-mercaptomethylbenzimidazole, zinc salt of 2-mercaptobenzimidazole, 2-mercaptomethylbenzimidazole, and zinc dibutylthiocarbamate; a phosphorus-based antioxidant such as triphenyl phosphite, tris(methylphenyl) phosphite, triisooctyl phosphite, tridecyl phosphite, tris(2-ethylhexyl)phosphite, tris(nonylphenyl) phosphite, tris(octylphenyl)phosphite, tris[decylpoly(oxyethylene)] phosphite, tris(cyclohexylphenyl)phosphite, tricyclohexyl phosphite, tri(decyl)thiophosphite, triisodecylthiophosphite, phenyl-bis(2-ethylhexyl)phosphite, phenyl-diisodecyl phosphite, tetradecylpoly(oxyethylene)-bis(ethylphenyl)phosphite, phenyl-dicyclohexyl phosphite, phenyl-diisooctyl phosphite, phenyl-di(tridecyl) phosphite, diphenyl-cyclohexyl phosphite, diphenyl-isooctyl phosphite, diphenyl-2-ethylhexyl phosphite, diphenyl-isodecyl phosphite, diphenyl-cyclohexylphenyl phosphite, and diphenyl-(tridecyl) thio phosphite; and an aromatic amine-based antioxidant such as phenylnaphthylamine, 4,4'-dimethoxydiphenylamine, 4,4'-bis(α,α-dimethylbenzyl) diphenylamine, di-tert-butyldiphenylamine, N,N'-di(octylphenyl)amine, 4-isopropoxydiphenylamine; and N,N'-di(2-naphthyl)-p-phenylenediamine.

These antioxidants may be used alone or in combination. Among these, a hindered phenol compound is desirable because of its high discoloration suppressing effect.

Examples of trade names of the antioxidant of the hindered phenol compound include Irganox 245, Irganox 259, Irganox 565, Irganox 1010, Irganox 1035, Irganox 1076, Irganox 1081, Irganox 1098, Irganox 1222, Irganox 1330, and Irganox 1425 WL (all manufactured by Basf SE).

The amount of the antioxidant blended is preferably in a range of 0.1 to 5 parts by mass, more preferably 0.2 to 3 parts by mass with respect to 100 parts by mass of the ink. When the amount of the antioxidant blended is 0.1 parts by mass or more with respect to 100 parts by mass of the ink, the effect of preventing the discoloration of the coating film is large. When the amount of the antioxidant blended is 5 parts by mass or less with respect to 100 parts by mass of the ink, the storage stability of the ink and the adhesiveness of the coating film become good.

(Deodorizer, Perfume)

It is preferable that the curable composition for inkjet of the present invention further contains a deodorizer or a perfume, from the viewpoint of suppressing an odor of the ink and an odor generated upon heating of the cured film.

The deodorizer that can be used in the present invention is not particularly limited, but a deodorizer that is chemically bonded to amine or aldehyde is preferable.

Examples of the deodorizer that is chemically bonded to amine include sarcosine-based compounds such as N-oleoylsarcosine. Examples of the deodorizer that is chemically bonded to aldehyde include hydrazide-based compounds such as Chemcatch P-9600 and Chemcatch T-6900 (Otsuka Chemical Co., Ltd.).

Examples of the perfume that can be used in the present invention include the following.

(1) Essential oils such as grapefruit oil, orange oil, lemon oil, lime oil, nutmeg oil, cassia oil, lavender oil, hinoki oil, fennel oil, ylang ylang oil, camomile oil, jasmine oil, hiba oil, peppermint oil, lavender oil and rosemary oil.

(2) Alcohols such as hexyl alcohol, phenylethyl alcohol (Rose P), furfuryl alcohol, cyclotene, geraniol linalool, linalool, 1-menthol, borneol, lanvazulol, hexyl alcohol, cyclotene, maltol, eugenol, and α-phenylethanol.

(3) Aldehydes such as tetradecanal, hexadecanal, octadecanal, benzaldehyde, and furfural.

(4) Aldehydes such as ethyl acetoacetate, propyl acetate, amyl acetate, linalyl acetate, benzyl acetate, dimethylbenzyl carbinyl acetate, benzyl propionate, heptanal, octanal, dodecanal, citral, liral, cyclamen aldehyde, and vanillin.

(5) Aromatic compounds such as nootkatone, ethylpyrazine, lemon turpentine, orange turpentine, vanillin, ethylvanillin, furfuryl mercaptan, borneol and heliotrope, vanillin, and ethylvanillin.

(6) Esters such as ethyl acetate, propyl acetate, amyl acetate, linalyl acetate, benzyl acetate, dimethylbenzylcarbinyl acetate, benzyl propionate, and geranyl acetate.

Among these, linalool, vanillin, and ethyl vanillin are preferable.

In the present invention, perfume blends obtained by suitably combining the above-described perfumes, for example, various perfume blends such as banana perfume, blueberry perfume, vanilla perfume, mint perfume, apple perfume, peach perfume, melon perfume, pineapple perfume, grape perfume, lilac perfume and jasmine perfume, can also be formulated and used.

In addition, commercially available various formulated perfume blends, such as vanilla perfume (Vanilla BVK-3359 (manufactured by TAKASAGO INTERNATIONAL CORPORATION)), mint perfume (Mint THP-8148 (manufactured by T. HASEGAWA CO., LTD.)), banana perfume (Banana T-1510 (manufactured by YAMAMOTO PERFUMERY CO., LTD.)), blueberry perfume (blueberry V-647 (manufactured by YAMAMOTO PERFUMERY CO., LTD.)), and fennel oil N-3707 (manufactured by TAKASAGO INTERNATIONAL CORPORATION) can also be used.

The content of these perfumes is in the range of 0.01 to 10% by mass, preferably 0.01 to 5% by mass based on the total amount of the ink. When the content of these perfumes is 0.01% by mass or more, the fragrance can be perceived, and when the content is 10% by mass or less, the curability is preferably not affected.

[Physical Properties]

In a case where the inkjet curable composition does not contain a gelling agent, the viscosity of the curable composition at 40° C. is preferably 7 to 15 mPa-s and more preferably 8 to 13 mPa-s. When the viscosity is within the above range, the ejection stability of the ink can be further improved.

When the curable composition contains a gelling agent, the viscosity of the curable composition at 80° C. is preferably 3 to 20 mPa-s and more preferably 7 to 9 mPa-s, from the viewpoint of further enhancing the ejectability from an inkjet head.

When the curable composition contains a gelling agent, the curable composition preferably undergoes sol-gel phase transition at a temperature of 40° C. or higher and lower than 100° C.

The gelation temperature of the curable composition is preferably 40 to 70° C. When the gelation temperature of the curable composition is 40° C. or higher, the ink is rapidly gelled after landing on a recording medium, and thus the pinning property is further enhanced. When the gelation temperature of the ink is 70° C. or lower, the ink is unlikely to be gelled at the time of ejection of the ink from an inkjet head in which the ink temperature is usually about 80° C., and thus the ink can be ejected more stably.

The viscosity at 40° C., viscosity at 80° C., and gelation temperature of an ink can be determined by measuring the temperature change of the dynamic viscoelasticity of the ink with a rheometer. Examples of the rheometer include stress-controlled rheometers Physica MCR series (manufactured by Anton Paar GmbH).

Specifically, a temperature change curve of viscosity is obtained when the ink is heated to 100° C. and cooled to 25° C. under conditions of a shear rate of 11.7 (1/s) and a temperature decrease rate of 0.1° C./s. Then, the viscosity at 40° C. and the viscosity at 80° C. can be determined by reading the viscosities at 40° C. and 80° C., respectively in the temperature change curve of viscosity. The gelation temperature can be determined as a temperature at which the viscosity becomes 200 mPa-s in the temperature change curve of viscosity.

[Method for Preparing Inkjet Curable Composition]

The inkjet curable composition according to the present invention can be prepared by mixing the respective components described above. At this time, it is preferable to mix the components while heating in order to enhance the solubility of each component.

A pigment dispersion liquid containing the pigment and the pigment dispersant may be prepared in advance, and the remaining components may be added thereto and mixed. At this time, the pigment can be dispersed with, for example, a ball mill, a sand mill, an attritor, a roll mill, an agitator, a Henschel mixer, a colloid mill, an ultrasonic homogenizer, a pearl mill, a wet-type jet mill, or a paint shaker.

The curable composition for inkjet can be used for forming a solder resist (insulating film) for electronic members. Thus, the curable composition can be used, for example, as a solder resist ink for forming a solder resist on a printed wiring board, and an ink for forming a solder resist on a semiconductor/IC package, an RFID antenna, and the like. The curable composition can also be used for an ink for a semiconductor sealing agent, an ink for an underfill material, an ink for a die bonding material, an ink for a black matrix of a light-emitting diode (LED) or an image display device, and an ink for a multilayer substrate prepreg.

[Inkjet Recording Method]

The inkjet recording method of the present invention is an inkjet recording method including ejecting a curable composition for inkjet onto a base material, and curing the curable composition for inkjet with an active ray, wherein the curable composition for inkjet of the present invention is used, and a base material containing a metal is used as the base material.

Specifically, the inkjet recording method of the present invention includes applying the above-described curable composition for inkjet onto a surface of a base material, and irradiating the applied curable composition with an active ray to cure the curable composition.

(1) Applying Ink

In this step, the curable composition for inkjet according to the present invention is applied to a base material by an inkjet method.

The ejection system from an inkjet head may be either an on-demand system or a continuous system.

The inkjet head of the on-demand system may be any of an electrical to mechanical conversion system such as a single cavity type, a double cavity type, a bender type, a piston type, a share mode type, and a shared wall type, or an electrical to thermal conversion system such as a thermal inkjet type and a bubble jet type. "Bubble Jet" is a registered trademark of Canon Inc.

The ink is preferably heated so that the temperature of the ink when filled in the inkjet head is 40° C. or higher. In particular, the temperature of the ink is preferably set to 40 to 100° C. and more preferably 40 to 90° C. Setting the temperature of the ink to the above range can further enhance the ejection properties from an inkjet head.

In particular, when the ink contains a gelling agent, the liquid droplets of the ink are heated and ejected from the inkjet head in a isolated state. Thus, the temperature of the ink when filled in an inkjet head is preferably set to be the gelation temperature of the ink+10° C. or higher and the gelation temperature+30° C. or lower.

When the temperature of the active ray-curable ink in the inkjet head is the gelation temperature+10° C. or higher, reduction in ejection properties due to gelation of the ink in the inkjet head or on the nozzle surface is less likely to occur. On the other hand, when the temperature of the ink in the inkjet head is the gelation temperature+30° C. or lower, deterioration of the components due to a high temperature is less likely to occur.

The method of heating the ink is not particularly limited. As the heating method, for example, at least one of an ink supply system such as an ink tank constituting a head carriage, a supply pipe, and a front chamber ink tank immediately before the head, a pipe with a filter, and a piezoelectric head can be heated with a panel heater, a ribbon heater, a temperature maintaining water, and the like.

The droplet amount of the ink ejected is preferably 3.0 to 9.0 pL, from the viewpoint of forming a finer pattern while increasing the pattern forming speed.

Examples of the electronic member include a printed wiring board, a semiconductor or IC package, and a mini-micro LED.

Examples of the base material that is a metal portion of the electronic member may include nickel and aluminum, in addition to copper.

(2) Irradiating with Active Ray

In this step, the ink applied to the surface of the base material is irradiated with an active ray to cure the ink.

The active ray can be selected from, for example, an electron beam, an ultraviolet ray, an $\alpha$-ray, a $\gamma$-ray, and an X-ray, but is preferably an ultraviolet ray or an electron beam.

The ultraviolet ray is preferably a ray having a peak wavelength in 360 to 410 nm. The ultraviolet ray is preferably emitted from an LED light source. LED emits less radiant heat than a conventional light source (e.g., a metal halide lamp). Thus, when LED is used, the ink is less likely to be dissolved at the time of irradiation with an active ray, and uneven brightness or the like is less likely to occur.

(3) Heating

The inkjet recording method of the present invention may further include heating the base material at 140° C. or higher.

By performing this heating, the hardness of the solder resist is improved.

The heating temperature of the base material is preferably 140 to 180° C. The heating time is preferably 30 to 120 minutes, and more preferably 30 to 60 minutes.

[Solder Resist]

The solder resist of the present invention is characterized by containing the curable composition for inkjet described above.

That is, the solder resist of the present invention is formed by irradiating the above-described curable composition for inkjet with an active ray. The solder resist can be formed by the above-described inkjet recording method.

An electric resistance value of the solder resist is $1.0\times10^{8}\Omega$ or more. The electric resistance value is preferably $1.0\times10^{8}$ to $1.0\times10^{18}\Omega$ and more preferably $1.0\times10^{10}$ to $1.0\times10^{18}\Omega$. The electric resistance value is particularly preferably $1.0\times10^{11}$ to $1.0\times10^{18}\Omega$.

[Printed Wiring Board]

The printed wiring board according to the present invention has the above-described solder resist on a base material (substrate).

As the base material on which the solder resist is formed, a base substrate on which a conductive film such as copper foil is formed can be used. The base substrate includes a rigid substrate and a flexible substrate.

Examples of the rigid substrate include a paper phenol substrate, a paper epoxy substrate, a glass epoxy substrate, a glass polyimide substrate, a Teflon® substrate, a PPO substrate, and a composite base material epoxy substrate.

Examples of the material of the flexible substrate include a PET film and a polyimide film.

EXAMPLES

Hereinafter, the present invention will be specifically described with reference to Examples, but the present invention is not limited thereto. Note that in the following Examples, operations were performed at room temperature (25° C.) unless otherwise specified. Further, unless otherwise specified, "%" and "part(s)" mean "% by mass" and "part(s) by mass," respectively.

[Preparation of Materials]

<Polymerizable Compound>

The following compounds were used as the polymerizable compounds.

Carboxy group-containing polymerizable compound A-10

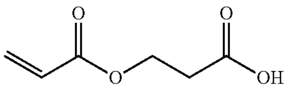

Carboxy group-containing polymerizable compound A-3

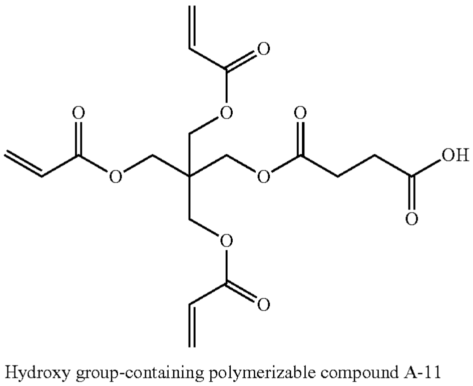

Hydroxy group-containing polymerizable compound A-11

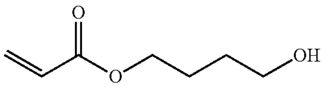

Hydroxy group-containing polymerizable compound A-12

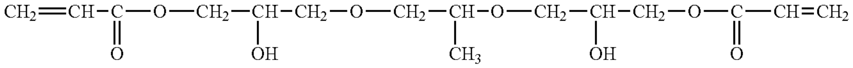

Epoxy resin-containing polymerizable compound A-21

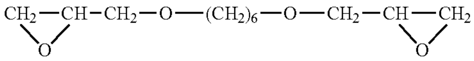

Epoxy resin-containing polymerizable compound A-22

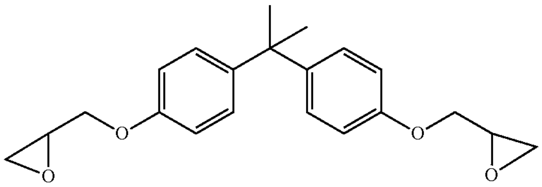

Dipentaerythritol hexaacrylate (hexa-functional)

Propoxylated(3) trimethylolpropane triacrylate (tri-functional)

Dipropylene glycol diacrylate (bi-functional)

<Nitrogen-Containing Aromatic Heterocyclic Compound which has Tertiary Amine>

As the nitrogen-containing aromatic heterocyclic compound which has a tertiary amine, the following B-1 to B-10 were used.

B-1

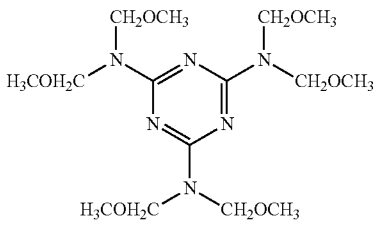

B-2

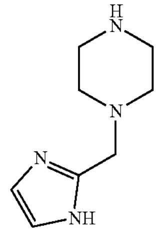

B-3

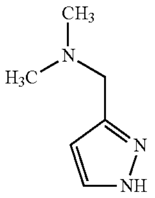

B-4

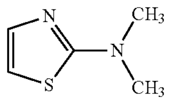

B-5

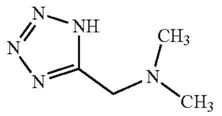

B-6

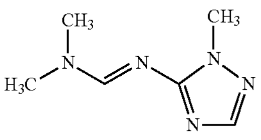

B-7

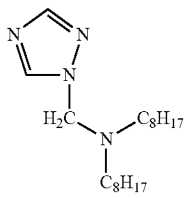

-continued

B-8

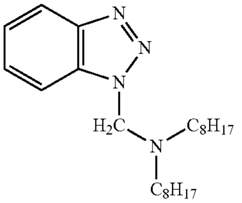

1-[N,N-bis(2-ethylhexyl)aminomethyl]benzotriazole

B-9

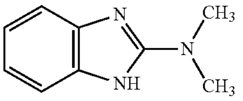

B-10

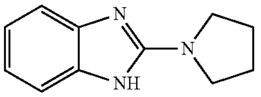

<Other Nitrogen-Containing Aromatic Heterocyclic Compounds>

The following were used as other nitrogen-containing aromatic heterocyclic compounds.

Melamine

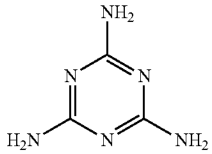

CYMEL NF-2000A (by Allnex)

Tris(Alkoxycarbonylamino) Triazine

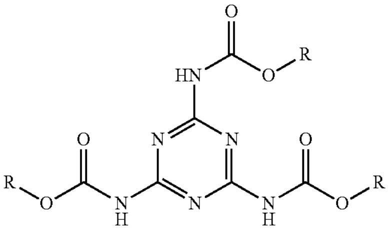

R = $CH_3$, n-$C_4H_9$

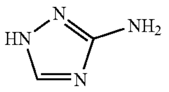

Amitrol

<Polymerization Initiator>

As the polymerization initiator, the following initiators 1 to 3 were used.

Initiator 1: Omnirad 907 (manufactured by Igm Resins B.V.) (acetophenone-based initiator, intramolecular cleavage type, α-aminoalkylphenone)

Initiator 2: Omnirad 819 (manufactured by Igm Resins B.V.) (acylphosphine-based initiator, intramolecular cleavage type, bis(2,4,6-trimethylbenzoyl)-phenyl-phosphineoxide phenylbis(2,4,6-trimethylbenzoyl) phosphineoxide)

Initiator 3: Speedcure ITX (manufactured by Sartomer) (thioxanthone-based initiator, hydrogen abstraction type, 2-isopropylthioxanthone)

<Polymerization Inhibitor>

As the polymerization inhibitor, the following were used.

MEHQ (hydroquinone monomethyl ether)

Irgastab UV-10 (N-oxyls, manufactured by BASF Japan Ltd.)

NPHA (N-nitroso-N-phenylhydroxylamine aluminum, nitrosamines)

<Preparation of Pigment Dispersion Liquid>

(Preparation of Yellow Pigment Dispersion Liquid)

The following materials were placed in a stainless steel beaker, heated, stirred, and dissolved for 1 hour while heating on a hot plate at 65° C., and cooled to room temperature. Thereafter, 15.0 parts by mass of yellow pigment PY185 (Paliotol Yellow D1155, manufactured by Basf SE) were added to the stainless steel beaker. Thereafter, the mixed solution in the stainless beaker and 200 g of zirconia beads (0.5 mm in diameter) were placed in a glass bottle, and the glass bottle was sealed. This was subjected to a dispersion treatment with a paint shaker (5400, manufactured by Red Devil, Inc.) until a desired particle size was obtained, and then the zirconia beads were removed to prepare a yellow pigment dispersion liquid.

| | |
|---|---|
| Pigment dispersant 1 (EFKA PX4701, manufactured by Basf SE) | 11.2 parts by mass |
| Synergist 1 (Solsperse 22000, manufactured by Lubrizol Corporation) | 3.0 parts by mass |
| Dispersion medium: dipropylene glycol diacrylate | 70.8 parts by mass |

(Preparation of Cyan Pigment Dispersion Liquid)

A cyan pigment dispersion liquid was prepared in the same manner as the yellow pigment dispersion liquid except that the amount of the dispersing agent and the amount of the dispersion medium were changed as described below, the pigment added was changed to 23.0 parts by mass of cyan pigment PB15:4 (Chromofine Blue 6332JC, manufactured by Dainichiseika Color & Chemicals Mfg. Co., Ltd.), and Synergist 1 was not added. Note that cyan pigment PB15:4 is a pigment that has been subjected to a synergist treatment.

| | |
|---|---|
| Pigment dispersant 1 (EFKA PX4701, manufactured by Basf SE) | 7.0 parts by mass |
| Dispersion medium: dipropylene glycol diacrylate | 70.0 parts by mass |

The above-described yellow pigment and cyan pigment are pigments that have been subjected to a water washing treatment and in which the amount of impurities (electrically conductive substances and ionic impurities) has been reduced.

The following dye was used.

Solvent Blue 35

[Preparation of Inkjet Ink]

<Preparation of Inkjet Ink 1>

An inkjet ink was prepared by mixing 3.0 parts by mass of the yellow pigment dispersion liquid and 3.0 parts by mass of the cyan pigment dispersion liquid, and adding the following materials to the obtained mixed liquid while stirring.

| | |
|---|---|
| (Polymerizable compound) | |
| Carboxy group-containing polymerizable compound A-10 | 10.0 parts by mass |
| Dipentaerythritol hexaacrylate | 10.0 parts by mass |
| Propoxylated(3) trimethylolpropane triacrylate | 30.0 parts by mass |
| Dipropylene glycol diacrylate | 37.9 parts by mass |
| (Polymerization initiator) | |
| Initiator 2 | 3.0 parts by mass |
| Initiator 3 | 3.0 parts by mass |
| (Polymerization Inhibitor) | |
| Irgastab UV-10 (manufactured by Basf SE) | 0.1 parts by mass |

The obtained ink composition was filtered through a 3.0-μm membrane filter (manufactured by ADVANTECH) to obtain inkjet ink 1.

<Preparation of Inkjet Inks 2 to 24>

Inkjet inks 2 to 24 were obtained in the same manner as in the preparation of the inkjet ink 1 except that the materials and amounts used were changed to obtain the ink compositions as shown in the following Tables I to III.

TABLE I

| | | Units [parts by mass] | | | | | | | | | |
|---|---|---|---|---|---|---|---|---|---|---|---|
| | Ink No. | 1 | 2 | 3 | 4 | 5 | 6 | 7 | 8 | 9 | 10 |
| Polymerizable compound | carboxy group-containing polymerizable compound A-10 | 10 | 10 | 10 | 10 | 10 | 10 | 10 | 10 | 10 | 10 |
| | carboxy group-containing polymerizable compound A-3 | — | — | — | — | | — | | — | | — |
| | hydroxy group-containing polymerizable compound A-11 | — | — | — | — | — | — | — | — | — | — |
| | hydroxy group-containing polymerizable compound A-12 | — | — | — | — | — | — | — | — | — | — |
| | epoxy group-containing polymerizable compound A-21 | — | — | — | — | — | — | — | — | — | — |
| | epoxy group-containing polymerizable compound A-22 | — | — | — | — | — | — | — | — | — | — |
| | dipentaerythritol hexaacrylate | 10 | 10 | 10 | 10 | 10 | 10 | 10 | 10 | 10 | 10 |
| | propoxylated(3) trimethylolpropane triacrylate | 30 | 30 | 30 | 30 | 30 | 30 | 30 | 30 | 30 | 30 |
| | dipropylene glycol diacrylate | 37.9 | 36.9 | 36.9 | 36.9 | 36.9 | 36.9 | 36.9 | 36.9 | 36.9 | 36.9 |
| Nitrogen-containing | B-1 | — | — | — | — | — | — | — | — | 1 | — |
| Aromatic | B-2 | — | — | — | — | — | — | — | — | — | 1 |
| Heterocyclic | B-3 | — | — | — | — | — | — | — | — | — | — |
| Compound | B-4 | — | — | — | — | — | — | — | — | — | — |
| which has | B-5 | — | — | — | — | — | — | — | — | — | — |
| tertiary | B-6 | — | — | — | — | — | — | — | — | — | — |
| amine | B-7 | — | — | — | — | — | — | — | — | — | — |
| | B-8 | — | — | — | — | 1 | 1 | — | — | — | — |

TABLE I-continued

| | Ink No. | Units [parts by mass] 1 | 2 | 3 | 4 | 5 | 6 | 7 | 8 | 9 | 10 |
|---|---|---|---|---|---|---|---|---|---|---|---|
| | B-9 | — | — | — | — | — | — | 1 | — | — | — |
| | B-10 | — | — | — | — | — | — | — | 1 | — | — |
| Other nitrogen-containing aromatic heterocyclic compounds | melamine | — | 1 | — | — | — | — | — | — | — | — |
| | CYMEL NF-2000A | — | — | 1 | — | — | — | — | — | — | — |
| | amitrol | — | — | — | 1 | — | — | — | — | — | — |
| Polymerization initiator | initiator 1 | — | — | — | — | — | — | — | — | — | — |
| | initiator 2 | 3 | 3 | 3 | 3 | 3 | 3 | 3 | 3 | 3 | 3 |
| | initiator 3 | 3 | 3 | 3 | 3 | 3 | 3 | 3 | 3 | 3 | 3 |
| Polymerization inhibitor | MEHQ | — | — | — | — | — | — | — | — | — | — |
| | Irgastab-UV10 | 0.1 | 0.1 | 0.1 | 0.1 | 0.1 | 0.1 | 0.1 | 0.1 | 0.1 | 0.1 |
| | NPHA | — | — | — | — | — | — | — | — | — | — |
| Pigment dispersion liquid | yellow pigment dispersion liquid | 3 | 3 | 3 | 3 | — | 3 | 3 | 3 | 3 | 3 |
| | cyan pigment dispersion liquid | 3 | 3 | 3 | 3 | — | 3 | 3 | 3 | 3 | 3 |
| dye | Solvent Blue 35 | — | — | — | — | 6 | — | — | — | — | — |
| | Total | 100 | 100 | 100 | 100 | 100 | 100 | 100 | 100 | 100 | 100 |

TABLE II

| | Ink No. | Units [parts by mass] 11 | 12 | 13 | 14 | 15 | 16 | 17 |
|---|---|---|---|---|---|---|---|---|
| Polymerizable compound | carboxy group-containing polymerizable compound A-10 | 10 | 10 | 10 | 10 | 10 | — | — |
| | carboxy group-containing polymerizable compound A-3 | — | — | — | — | — | — | 10 |
| | hydroxy group-containing polymerizable compound A-11 | — | — | — | — | — | — | — |
| | hydroxy group-containing polymerizable compound A-12 | — | — | — | — | — | — | — |
| | epoxy group-containing polymerizable compound A-21 | — | — | — | — | — | — | — |
| | epoxy group-containing polymerizable compound A-22 | — | — | — | — | — | — | — |
| | dipentaerythritol hexaacrylate | 10 | 10 | 10 | 10 | 10 | 10 | 10 |
| | propoxylated(3) trimethylolpropane triacrylate | 30 | 30 | 30 | 30 | 30 | 30 | 30 |
| | dipropylene glycol diacrylate | 36.9 | 36.9 | 36.9 | 36.9 | 36.9 | 46.9 | 36.9 |
| Nitrogen-containing aromatic heterocyclic compound which has tertiary amine | B-1 | — | — | — | — | — | — | — |
| | B-2 | — | — | — | — | — | — | — |
| | B-3 | 1 | — | — | — | — | — | — |
| | B-4 | — | 1 | — | — | — | — | — |
| | B-5 | — | — | 1 | — | — | — | — |
| | B-6 | — | — | — | 1 | — | — | — |
| | B-7 | — | — | — | — | 1 | 1 | 1 |
| | B-8 | — | — | — | — | — | — | — |
| | B-9 | — | — | — | — | — | — | — |
| | B-10 | — | — | — | — | — | — | — |
| Other nitrogen-containing aromatic heterocyclic compounds | melamine | — | — | — | — | — | — | — |
| | CYMEL NF-2000A | — | — | — | — | — | — | — |
| | amitrol | — | — | — | — | — | — | — |
| Polymerization initiator | initiator 1 | — | — | — | — | — | — | — |
| | initiator 2 | 3 | 3 | 3 | 3 | 3 | 3 | 3 |
| | initiator 3 | 3 | 3 | 3 | 3 | 3 | 3 | 3 |
| Polymerization inhibitor | MEHQ | — | — | — | — | — | — | — |
| | Irgastab-UV10 | 0.1 | 0.1 | 0.1 | 0.1 | 0.1 | 0.1 | 0.1 |
| | NPHA | — | — | — | — | — | — | — |
| Pigment dispersion liquid | yellow pigment dispersion liquid | 3 | 3 | 3 | 3 | 3 | 3 | 3 |
| | cyan pigment dispersion liquid | 3 | 3 | 3 | 3 | 3 | 3 | 3 |
| dye | Solvent Blue 35 | — | — | — | — | — | — | — |
| | Total | 100 | 100 | 100 | 100 | 100 | 100 | 100 |

TABLE III

| | | Units [parts by mass] | | | | | | |
|---|---|---|---|---|---|---|---|---|
| | Ink No. | 18 | 19 | 20 | 21 | 22 | 23 | 24 |
| Polymerizable compound | carboxy group-containing polymerizable compound A-10 | — | — | — | — | — | — | — |
| | carboxy group-containing polymerizable compound A-3 | — | — | — | — | 10 | 10 | 10 |
| | hydroxy group-containing polymerizable compound A-11 | 10 | — | — | — | — | — | — |
| | hydroxy group-containing polymerizable compound A-12 | — | 10 | — | — | — | — | — |
| | epoxy group-containing polymerizable compound A-21 | — | — | 10 | — | — | — | — |
| | epoxy group-containing polymerizable compound A-22 | — | — | — | 10 | — | — | — |
| | dipentaerythritol hexaacrylate | 10 | 10 | 10 | 10 | 10 | 10 | 10 |
| | propoxylated(3) trimethylolpropane triacrylate | 30 | 30 | 30 | 30 | 30 | 30 | 30 |
| | dipropylene glycol diacrylate | 36.9 | 36.9 | 36.9 | 36.9 | 36.9 | 36.9 | 36.9 |
| Nitrogen-containing Aromatic Heterocyclic Compound which has tertiary amine | B-1 | — | — | — | — | — | — | — |
| | B-2 | — | — | — | — | — | — | — |
| | B-3 | — | — | — | — | — | — | — |
| | B-4 | — | — | — | — | — | — | — |
| | B-5 | — | — | — | — | — | — | — |
| | B-6 | — | — | — | — | — | — | — |
| | B-7 | 1 | 1 | 1 | 1 | 1 | 1 | 1 |
| | B-8 | — | — | — | — | — | — | — |
| | B-9 | — | — | — | — | — | — | — |
| | B-10 | — | — | — | — | — | — | — |
| Other nitrogen-containing aromatic heterocyclic compounds | melamine | — | — | — | — | — | — | — |
| | CYMEL NF-2000A | — | — | — | — | — | — | — |
| | amitrol | — | — | — | — | — | — | — |
| Polymerization initiator | initiator 1 | — | — | — | — | — | 3 | — |
| | initiator 2 | 3 | 3 | 3 | 3 | 3 | 3 | 3 |
| | initiator 3 | 3 | 3 | 3 | 3 | 3 | — | 3 |
| Polymerization inhibitor | MEHQ | — | — | — | — | — | — | 0.1 |
| | Irgastab-UV10 | 0.1 | 0.1 | 0.1 | 0.1 | — | — | — |
| | NPHA | — | — | — | — | 0.1 | 0.1 | — |
| Pigment Dispersion liquid | yellow pigment dispersion liquid | 3 | 3 | 3 | 3 | 3 | 3 | 3 |
| | cyan pigment dispersion liquid | 3 | 3 | 3 | 3 | 3 | 3 | 3 |
| dye | Solvent Blue 35 | — | — | — | — | — | — | — |
| | Total | 100 | 100 | 100 | 100 | 100 | 100 | 100 |

[Formation of Cured Film]

Each of the prepared inks was loaded into an inkjet recording apparatus having an inkjet recording head provided with a piezo-type inkjet nozzle. Next, a voltage was applied to the inkjet recording head such that the droplet ejection amount was 6.0 pL. Next, on a copper-clad laminate for printed wiring board (FR-4, 1.6 mm thick, 150 mm×95 mm large), a 20 mm×50 mm, 30 μm-thick solid pattern and a 30 μm-thick comb-shaped thin line pattern with a line and space of 100 μm were formed, respectively. At the time of pattern formation, the ink in the inkjet recording head was heated to 80° C. with a built-in heater of the recording head.

The ink layer was cured by irradiating the printed pattern with ultraviolet rays using an LED lamp (Fire Jet™ FJ100, manufactured by Phoseon Technology, Inc., wavelength 395 nm) so that the intensity became 500 mJ/$cm^2$.

Thereafter, the copper-clad laminate having the pattern formed thereon was placed in an oven set at 150° C. and heated for 60 minutes to further cure the ink layer, thereby obtaining a cured film.

The cured film was formed under three conditions: immediately after the preparation of the ink, after the storage of the ink at 85° C. for 4 days, and after the storage of the ink at 85° C. for 8 days.

[Evaluation]

<Discoloration>

The cured film of the solid pattern before being placed in an oven in the [Formation of Cured Film] was measured for L*a*b* by reflected light measurement using a spectrofluorometer FD-7 (manufactured by KONICA MINOLTA, INC.) under the following conditions.

Illumination conditions: MO (A), observation light sources: D50, observation conditions: 2° field of view The cured film after heating in an oven at 150° C. for 60 minutes was measured for L*a*b* in the same manner as described above.

The cured film after heating in an oven at 150° C. for 60 minutes and immersing in a solder bath at 260° C. three times for 10 seconds was measured for L*a*b* in the same manner as described above.

The ΔE before and after at 150° C. for 60 minutes and before and after soldering was calculated using the following calculation formula and evaluated based on the following criteria, and “A”, “B”, and “C” were regarded as having no practical problems.

The above-mentioned L*a*b* were measured for each of the cured films formed under the three conditions of immediately after the preparation of the ink, after the storage of the ink at 85° C. for 4 days, and after the storage of the ink at 85° C. for 8 days $$\Delta E = \left[(\Delta L^*)^2 + (\Delta a^*)^2 + (\Delta b^*)^2\right]^{1/2}$$

(Criteria)

$A$: $\Delta E \leq 6$ $B$: $6 < \Delta E \leq 10$ $C$: $10 < \Delta E \leq 15$ $D$: $15 < \Delta E$ <Adhesiveness>

On the obtained cured film having a solid pattern, cuts were made in the form of lattices in accordance with the cross-cut method of JIS K5600-5-6:1999, and a pressure-sensitive adhesive tape was attached. The pressure-sensitive adhesive tape was then peeled off, the state of peeling of the cured film from the substrate was observed, and the adhesion residual ratio was determined. Here, the adhesion residual ratio refers to a ratio of the number of squares in which the cured film remains after the tape is peeled off to the number of squares formed by making the cuts.

The adhesion residual ratio was determined for each of the cured films formed under the three conditions of immediately after the preparation of the ink, after the storage of the ink at 85° C. for 4 days, and after the storage of the ink at 85° C. for 8 days, and the adhesiveness was evaluated based on each adhesion residual ratio according to the following evaluation criteria. “A,” “B,” and “C” were regarded as having no practical problems.

(Criteria)

A: The adhesion residual ratio is 100%.

B: The adhesion residual ratio is 80% or more and less than 100%.

C: The adhesion residual ratio is 60% or more and less than 80%.

D: The adhesion residual ratio is less than 60%.

<Pencil Hardness>

For each sample of the prepared cured films, the pencil hardness of the surface was measured using Hi-Uni® manufactured by MITSUBISHI PENCIL COMPANY, LIMITED according to the method described in “JIS K 5400”.

Specifically, the wood part of a pencil was shaved off, and the lead was made to be 5 to 6 mm long. The tip of the lead of the pencil used was smoothly polished with polishing paper to have a circular cross section. This pencil was held at an angle of 45 degrees relative to the surface of the sample to scratch the cured film at an angle of 45 degrees with a 1 kg load applied to the sample surface.

The cured films formed under the three conditions of immediately after the preparation of the ink, after the storage of the ink at 85° C. for 4 days, and after the storage of the ink at 85° C. for 8 days were subjected to the measurement of pencil hardness, and the maximum hardness of the pencil in which the cured film did not reach a medium to be recorded was evaluated. A case where the maximum hardness of the pencil was 4H or more was regarded as the range having no practical problems.

<Solder Heat Resistance>

As a method for evaluating the heat resistance of the cured film, the following solder heat resistance was evaluated.

The printed sample of the solid pattern was immersed in a solder bath at 260° C. for 10 seconds three times, and then the adhesion residual ratio was calculated by the same method as that for the above-described “adhesiveness”, and the state of peeling of the cured film was evaluated according to the following criteria. The adhesion residual ratio was calculated for each of the cured films formed under the three conditions of immediately after the preparation of the ink, after the storage of the ink at 85° C. for 4 days, and after the storage of the ink at 85° C. for 8 days, and “A” and “B” in the following criteria were regarded as the range having no practical problems.

(Criteria)

A: The adhesion residual ratio is 90% or more and 100%.

B: The adhesion residual ratio is 90% or more and less than 100%.

C: The adhesion residual ratio is 70% or more and less than 90%.

D: The adhesion residual ratio is less than 70%.

<Plating Resistance>

Each sample of the cured films obtained above was plated with 0.5 μm of nickel and 0.03 μm of gold using a commercially available electroless nickel plating bath and electroless gold plating bath, and subjected to a cross-cut tape peel test. Regarding the cured films formed under the three conditions of immediately after the preparation of the ink, after the storage of the ink at 85° C. for 4 days, and after the storage of the ink at 85° C. for 8 days, the number of remaining lattices among 100 lattices was counted, and the evaluation was performed based on the following criteria. In the following criteria, “A” and “B” were regarded as the range having no practical problems.

(Criteria)

A: The number of remaining is 100 out of 100

B: The number of remaining is 80 to 99 out of 100

C: The number of remaining is 60 to 79 out of 100

D: The number of remaining is 59 or less out of 100

<Viscosity Fluctuation>

The viscosity at 80° C. of each of the prepared inks was measured with Physica MCR301 (manufactured by Anton Paar GmbH) at a shear rate of 1000 (1/s). The measurement was performed for the inks immediately after the preparation, after storage at 85° C. for 4 days, and after storage at 85° C. for 8 days. The difference of viscosity (viscosity fluctuation) between the ink immediately after the preparation and the ink after storage at 85° C. for 4 days and the difference of viscosity (viscosity fluctuation) between the ink immediately after the preparation and the ink after storage at 85° C. for 8 days were each calculated and evaluated according to the following criteria. In the following criteria, “A,” “B,” and “C” were regarded as the range having no practical problems.

(Criteria)

A: Viscosity fluctuation is less than 0.3 mPa-s

B: Viscosity fluctuation is 0.3 mPa-s or more and less than 0.7 mPa-s

C: Viscosity fluctuation is 0.7 mPa-s or more and less than 1.0 mPa-s

D: Viscosity fluctuation is 1.0 mPa-s or more

<Average Particle Size Fluctuation>

The average particle size (Z-average) of each of the prepared inks was measured by a dynamic light scattering method using Data Sizer Nano ZSP (manufactured by Malvern Panalytical Ltd.). The ink was diluted 200 times and then measured. The measurement temperature was 25° C. The measurement was performed for the inks immediately after the preparation, after storage at 85° C. for 4 days, and after storage at 85° C. for 8 days. The difference of average particle size (average particle size fluctuation) between the ink immediately after the preparation and the ink after storage at 85° C. for 4 days and the difference of average particle size (average particle size fluctuation)

between the ink immediately after the preparation and the ink after storage at 85° C. for 8 days were each calculated and evaluated according to the following criteria. In the following criteria, "A" and "B" were regarded as the range having no practical problems.

(Criteria)

A: Average particle size fluctuation is less than 15 nm

B: Average particle size fluctuation is 15 nm or more and less than 30 nm

C: Average particle size fluctuation is 30 nm or more and less tan 50 nm

D: Average particle size fluctuation is 50 nm or more:

TABLE IV

| | Ink No. | 1 | 2 | 3 | 4 | 5 |
|---|---|---|---|---|---|---|
| Ink immediately after preparation | Discoloration ΔE before and after 150° C. for 60 minutes | D | C | C | C | C |
| | Discoloration ΔE before and after soldering | D | D | D | D | D |
| | Adhesiveness | C | B | B | B | B |
| | Hardness | 5H | 5H | 5H | 5H | 5H |
| | Soldering heat resistance | C | B | B | B | B |
| | Plating resistance | C | B | B | B | B |
| Ink after storage at 85° c. for 4 days | Discoloration ΔE before and after 150° c. for 60 minutes | D | D | D | D | D |
| | Discoloration ΔE before and after soldering | D | D | D | D | D |
| | Adhesiveness | D | D | D | D | D |
| | Hardness | 3H | 3H | 3H | 3H | 3H |
| | Soldering heat resistance | D | D | D | D | B |
| | Plating resistance | D | D | D | D | B |
| | Viscosity fluctuation | C | D | D | D | B |
| | Particle size fluctuation | C | D | D | D | — |
| Ink after storage at 85° c. for 8 days | Discoloration ΔE before and after 150° C. for 60 minutes | D | D | D | D | D |
| | Discoloration ΔE before and after soldering | D | D | D | D | D |
| | Adhesiveness | D | D | D | D | B |
| | Hardness | 3H | 3H | 3H | 3H | 3H |
| | Soldering heat resistance | D | D | D | D | B |
| | Plating resistance | D | D | D | D | B |
| | Viscosity fluctuation | D | D | D | D | B |
| | Particle size fluctuation | D | D | D | D | B |
| | Remarks | Comparative Example 1 | Comparative Example 2 | Comparative Example 3 | Comparative Example 4 | Comparative Example 5 |

| | Ink No. | 6 | 7 | 8 | 9 | 10 |
|---|---|---|---|---|---|---|
| Ink immediately after preparation | Discoloration ΔE before and after 150° C. for 60 minutes | C | C | C | B | A |
| | Discoloration ΔE before and after soldering | C | C | C | B | B |
| | Adhesiveness | B | B | B | B | B |
| | Hardness | 5H | 5H | 5H | 5H | 5H |
| | Soldering heat resistance | B | B | B | B | B |

TABLE IV-continued

| | | | | | | |
|---|---|---|---|---|---|---|
| | Plating resistance | B | B | B | B | B |
| Ink after storage at 85° c. For 4 days | discoloration ΔE before and after 150° c. for 60 minutes | C | C | C | B | B |
| | Discoloration ΔE before and after soldering | C | C | C | B | B |
| | Adhesiveness | D | D | D | B | B |
| | Hardness | 3H | 3H | 3H | 5H | 5H |
| | Soldering heat resistance | B | B | B | B | B |
| | Plating resistance | B | B | B | B | B |
| | Viscosity fluctuation | B | B | B | B | B |
| | Particle size fluctuation | B | B | B | B | B |
| Ink after storage at 85° c. For 8 days | Discoloration ΔE before and after 150° C. for 60 minutes | C | C | C | B | B |
| | Discoloration ΔE before and after soldering | C | C | C | B | B |
| | Adhesiveness | B | B | B | B | B |
| | Hardness | 3H | 3H | 3H | 5H | 5H |
| | Soldering heat resistance | B | B | B | B | B |
| | Plating resistance | B | B | B | B | B |
| | Viscosity fluctuation | B | B | B | B | B |
| | Particle size fluctuation | B | B | B | B | B |
| | Remarks | Example 1 | Example 2 | Example 3 | Example 4 | Example 5 |

TABLE V

| Ink No. | | 11 | 12 | 13 | 14 | 15 | 16 | 17 |
|---|---|---|---|---|---|---|---|---|
| Ink immediately after preparation | Discoloration ΔE before and after 150° C. for 60 minutes | A | A | A | A | A | A | A |
| | Discoloration ΔE before and after soldering | B | B | B | B | B | C | A |
| | Adhesiveness | B | B | B | B | B | C | A |
| | Hardness | 5H | 5H | 5H | 5H | 5H | 5H | 5H |
| | Soldering heat resistance | B | B | B | B | B | B | B |
| | Plating resistance | B | B | B | B | A | B | A |
| Ink after storage at 85° C. for 4 days | Discoloration ΔE before and after 150° C. for 60 minutes | B | B | B | A | A | A | A |
| | Discoloration ΔE before and after soldering | B | B | B | B | B | C | A |
| | Adhesiveness | B | B | B | B | B | C | A |
| | Hardness | 5H | 5H | 5H | 5H | 5H | 5H | 5H |
| | Soldering heat resistance | B | B | B | B | B | B | B |
| | Plating resistance | B | B | B | B | A | A | A |
| | Viscosity fluctuation | B | B | B | B | B | B | B |
| | Particle size fluctuation | B | B | B | B | B | B | B |
| Ink after storage at 85° C. for 8 days | Discoloration ΔE before and after 150° C. for 60 minutes | B | B | B | A | A | A | A |
| | Discoloration ΔE before and after soldering | B | B | B | B | B | C | A |

TABLE V-continued

| Ink No. | 11 | 12 | 13 | 14 | 15 | 16 | 17 |
|---|---|---|---|---|---|---|---|
| Adhesiveness | B | B | B | B | B | C | A |
| Hardness | 5H | 5H | 5H | 5H | 5H | 5H | 5H |
| Soldering heat resistance | B | B | B | B | B | B | B |
| Plating resistance | B | B | B | B | A | A | A |
| Viscosity fluctuation | B | B | B | B | B | B | B |
| Particle size fluctuation | B | B | B | B | B | B | B |
| Remarks | Example 6 | Example 7 | Example 8 | Example 9 | Example 10 | Example 11 | Example 12 |

TABLE VI

| | Ink No. | 18 | 19 | 20 |
|---|---|---|---|---|
| Ink immediately after preparation | Discoloration ΔE before and after 150° C. for 60 minutes | A | A | A |
| | Discoloration ΔE before and after soldering | B | A | B |
| | Adhesiveness | B | B | B |
| | Hardness | 5H | 5H | 5H |
| | Soldering heat resistance | B | B | B |
| | Plating resistance | A | A | A |
| Ink after storage at 85° C. for 4 days | Discoloration ΔE before and after 150° C. for 60 minutes | A | A | A |
| | Discoloration ΔE before and after soldering | B | A | B |
| | Adhesiveness | B | B | B |
| | Hardness | 5H | 5H | 5H |
| | Soldering heat resistance | B | B | B |
| | Plating resistance | A | A | A |
| | Viscosity fluctuation | B | B | B |
| | Particle size fluctuation | B | B | B |
| Ink after storage at 85° C. for 8 days | Discoloration ΔE before and after 150° C. for 60 minutes | A | A | A |
| | Discoloration ΔE before and after soldering | B | A | B |
| | Adhesiveness | B | B | B |
| | Hardness | 5H | 5H | 5H |
| | Soldering heat resistance | B | B | B |
| | Plating resistance | A | A | A |
| | Viscosity fluctuation | B | B | B |
| | Particle size fluctuation | B | B | B |
| | Remarks | Example 13 | Example 14 | Example 15 |

| | Ink No. | 21 | 22 | 23 | 24 |
|---|---|---|---|---|---|
| Ink immediately after preparation | Discoloration ΔE before and after 150° C. for 60 minutes | A | A | A | A |
| | Discoloration ΔE before and after soldering | A | A | A | A |
| | Adhesiveness | B | A | A | A |
| | Hardness | 5H | 5H | 5H | 5H |
| | Soldering heat resistance | A | B | B | B |
| | Plating resistance | A | A | A | A |
| Ink after storage at 85° C. for 4 days | Discoloration ΔE before and after 150° C. for 60 minutes | A | A | A | A |
| | Discoloration ΔE before and after soldering | A | A | A | A |
| | Adhesiveness | B | A | A | A |
| | Hardness | 5H | 5H | 5H | 5H |
| | Soldering heat resistance | A | B | B | B |
| | Plating resistance | A | A | B | A |
| | Viscosity fluctuation | B | B | B | B |
| | Particle size fluctuation | B | B | B | B |

TABLE VI-continued

| | | | | | |
|---|---|---|---|---|---|
| Ink after storage at 85° C. for 8 days | Discoloration ΔE before and after 150° C. for 60 minutes | A | A | A | B |
| | Discoloration ΔE before and after soldering | A | A | A | B |
| | Adhesiveness | B | A | A | A |
| | Hardness | 5H | 5H | 5H | 5H |
| | Soldering heat resistance | A | B | B | B |
| | Plating resistance | A | A | B | A |
| | Viscosity fluctuation | B | B | B | C |
| | Particle size fluctuation | B | B | B | B |
| | Remarks | Example 16 | Example 17 | Example 18 | Example 19 |

As illustrated in the above results, the ink according to the present invention can suppress the viscosity fluctuation, the particle size fluctuation, and the change in the discoloration prevention performance after a lapse of time at high temperature as compared with the inks of Comparative Examples. Furthermore, it is recognized that the cured film formed by using the ink of the present invention is good in adhesiveness, hardness, soldering heat resistance and plating resistance after a lapse of time at high temperature as compared with the cured films formed by using the inks of Comparative Example.

The expression mechanism or action mechanism of the effect of the present invention is not clear, but it is presumed as follows.

(Nitrogen-Containing Aromatic Heterocyclic Compound has Tertiary Amine)

In a case where the aromatic heterocyclic compound does not have a tertiary amine, the aromatic heterocyclic compound (e.g., melamine or benzotriazole) is adsorbed to a pigment or a dispersant, thereby inhibiting adsorption of the dispersant to the pigment. As a result, the pigment aggregates, and the viscosity and particle size of the ink increase. In addition, the amount of the aromatic heterocycle that interacts with a base material, is reduced, and the discoloration preventing performance and the adhesion performance are not exhibited.

In contrast, when the nitrogen-containing aromatic heterocyclic compound has a tertiary amine as in the present invention, the nitrogen-containing aromatic heterocycle is less likely to interact with a pigment due to the steric hindrance of the tertiary amine. Thus, aggregation of the pigment is suppressed, and it is possible to prevent the viscosity and the particle size of the ink from increasing. In addition, the aromatic heterocycle interacting with a base material is not reduced, and thus it is possible to prevent discoloration. In particular, an increase in the viscosity and particle size of the ink after a lapse of time at high temperature can be prevented, and when formed into a cured film such as a solder resist, the improvements in heat resistance and plating resistance, and the improvements in adhesiveness to a base material and hardness can be attained.

Although embodiments of the present invention have been described and illustrated in detail, the disclosed embodiments are made for purposes of illustration and example only and not limitation. The scope of the present invention should be interpreted by terms of the appended claims.

The entire disclosure of Japanese Patent Application No. 2023-166177 filed on Sep. 27, 2023 and Japanese Patent Application No. 2024-034772 filed on Mar. 7, 2024 incorporated herein by reference in its entirety.

What is claimed is:

1. A curable composition for inkjet for metal-containing base material, comprising: a polymerizable compound; a polymerization initiator; and a pigment, and being cured by irradiation with an active ray, wherein the curable composition comprises a nitrogen-containing aromatic heterocyclic compound having a substituent containing a tertiary amine.

2. The curable composition for inkjet for metal-containing base material according to claim 1, wherein, in the nitrogen-containing aromatic heterocyclic compound, a benzene ring is not directly fused to a nitrogen-containing aromatic heterocycle.

3. The curable composition for inkjet for metal-containing base material according to claim 1, wherein the polymerizable compound is a polymerizable compound having a carboxy group, a hydroxy group, or an epoxy group.

4. The curable composition for inkjet for metal-containing base material according to claim 1, wherein the nitrogen-containing aromatic heterocyclic compound is a 5-membered nitrogen-containing aromatic heterocyclic compound.

5. The curable composition for inkjet for metal-containing base material according to claim 1, wherein the nitrogen-containing aromatic heterocyclic compound is a triazole compound.

6. The curable composition for inkjet for metal-containing base material according to claim 5, wherein the triazole compound has a structure represented by the following General Formula (a):

General Formula (a)

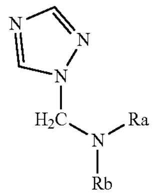

wherein, Ra and Rb each represent an alkyl group having 1 to 20 carbon atoms.

7. The curable composition for ink jet for metal-containing base material according to claim 3, wherein the polymerizable compound having a carboxy group has a structure represented by the following General Formula (1):

General Formula (1)

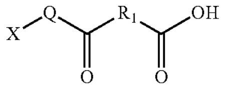

wherein, X represents a substituent having at least one selected from an acryloyl group, a methacryloyl group, an allyl group, a vinyl group, and a derivative thereof at a terminal thereof;

Q represents an oxygen atom or $NR_4$, and $R_4$ represents a hydrogen atom, a substituted or unsubstituted alkyl group, or a substituted or unsubstituted aryl group; and $R_1$ represents an unsubstituted alkylene group having 1 to 6 carbon atoms.

8. The curable composition for inkjet for metal-containing base material according to claim 3, wherein the polymerizable compound having a hydroxy group is an epoxy acrylate obtained by reacting a (meth)acrylic acid with an epoxy compound.

9. The curable composition for inkjet for metal-containing base material according to claim 3, wherein the polymerizable compound having a carboxy group, a hydroxy group, or an epoxy group has any of a bisphenol structure, a cresol novolac structure, or a phenol novolac structure.

10. The curable composition for inkjet for metal-containing base material according to claim 1, wherein thioxanthone is contained as the polymerization initiator.

11. The curable composition for inkjet for metal-containing base material according to claim 1, wherein an N-oxyl or a nitrosamine is contained as a polymerization inhibitor.

12. A solder resist comprising the curable composition for inkjet for metal-containing base material according to claim 1.

13. An inkjet recording method, comprising: ejecting a curable composition for inkjet onto a base material; and curing the curable composition for inkjet with an active ray, wherein the curable composition for inkjet is the curable composition for inkjet for metal-containing base material according to claim 1, and the base material is a base material containing a metal.

14. The inkjet recording method according to claim 13, further comprising heating the base material at 140° C. or higher.

15. The inkjet recording method according to claim 13, further comprising heating the curable composition for inkjet for metal-containing base material to 40° C. or higher in an inkjet head.

* * * * *